US012573297B2

(12) United States Patent
Son et al.

(10) Patent No.: US 12,573,297 B2
(45) Date of Patent: Mar. 10, 2026

(54) METHOD FOR PROVIDING BUS INFORMATION IN REAL TIME, AND SYSTEM AND APPLICATION IMPLEMENTING THE METHOD

(71) Applicant: Kakao Corp., Jeju-si (KR)

(72) Inventors: Sukyung Son, Seongnam-si (KR); Rakmin Sung, Seongnam-si (KR); Daehyun Im, Seongnam-si (KR); Gyeonghyeon Moon, Seongnam-si (KR); Yun Hee Jung, Seongnam-si (KR); Jaesung Choi, Seongnam-si (KR); Seoha Yu, Seongnam-si (KR); Binnara Lee, Seongnam-si (KR); Jaiwuk Chung, Seongnam-si (KR); Sung Hyeok Park, Seongnam-si (KR); Jinwoo Kim, Seongnam-si (KR); Shin Hyun Kim, Seongnam-si (KR); Gahee Jeong, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 74 days.

(21) Appl. No.: 18/212,831

(22) Filed: Jun. 22, 2023

(65) Prior Publication Data

US 2024/0119836 A1 Apr. 11, 2024

(30) Foreign Application Priority Data

Oct. 7, 2022 (KR) ........................ 10-2022-0128371
Oct. 7, 2022 (KR) ........................ 10-2022-0128372

(51) Int. Cl.
*G08G 1/13* (2006.01)

(52) U.S. Cl.
CPC ...................................... *G08G 1/13* (2013.01)

(58) Field of Classification Search
CPC ........................................................ G08G 1/13
See application file for complete search history.

(56) References Cited

U.S. PATENT DOCUMENTS

2014/0163861 A1* 6/2014 Beaurepaire ........... G01C 21/38 701/400
2021/0095973 A1* 4/2021 Simard .............. G01C 21/3438

FOREIGN PATENT DOCUMENTS

JP 2018005264 A * 1/2018
KR 10-2016-0104817 9/2016
KR 10-1671747 11/2016
KR 10-1690691 12/2016
KR 10-1737544 5/2017
(Continued)

OTHER PUBLICATIONS

Youtube Video: Brandywine School District: Where's the Bus App, and retrieval of website from https://wheresthebus.com/ (via wayback machine src—https://web.archive.org/web/20211020091157/https://wheresthebus.com/).*
(Continued)

*Primary Examiner* — Rufus C Point
(74) *Attorney, Agent, or Firm* — LEX IP MEISTER, PLLC

(57) ABSTRACT

Disclosed is a method for providing real-time bus information by a terminal, the method including: receiving ultra-precise bus information about buses scheduled to arrive at a bus stop from a server; and based on the ultra-precise bus information, displaying at least one bus which moves toward the bus stop and disappears after passing the bus stop on a map area.

17 Claims, 13 Drawing Sheets

10

(56) References Cited

FOREIGN PATENT DOCUMENTS

| | | | |
|---|---|---|---|
| KR | 10-1834801 | 3/2018 | |
| KR | 102128432 B1 * | 6/2020 | ............. G08G 1/133 |
| KR | 10-2215061 | 2/2021 | |

OTHER PUBLICATIONS

Oh Gyujin, 'KakaoMap provides ultra-precise bus location information in Busan area.' Daum Yunhap News (Aug. 10, 2022).

KakaoMap Official Blog, Announcement/Update '[KakaoMap APP] Expansion of ultra-precise bus service area!' (May 30, 2022).

* cited by examiner

METHOD FOR PROVIDING BUS INFORMATION IN REAL TIME, AND SYSTEM AND APPLICATION IMPLEMENTING THE METHOD

CROSS-REFERENCE TO RELATED APPLICATION

This application claims priority to and the benefit of Korean Patent Application No. 10-2022-0128371 filed in the Korean Intellectual Property Office on Oct. 7, 2022, and Korean Patent Application No. 10-2022-0128372 filed in the Korean Intellectual Property Office on Oct. 7, 2022, the entire contents of which are incorporated herein by reference.

BACKGROUND

(a) Field

The present disclosure relates to a map service.

(b) Description of the Related Art

The local government has implemented a bus information system that provides notification boards placed at bus stops to display bus arrival times. However, since the bus information system only provides bus arrival times by route at the bus stop, users are required to be aware of the specific bus route they need to take at the bus stop, and cannot get real-time information, such as traffic signal waiting or road congestion.

The map application provides pathfinding services notifying public transportation, such as subways and buses, along with their estimated arrival times. Recently, a new feature has been introduced that displays bus positions on a map, utilizing raw data collected from vehicle terminals. While bus position information services can provide users with intuitive information to track buses, there is still room for improvements to enhance user convenience and integrate with existing map services, such as pathfinding services.

SUMMARY

The present disclosure relates to a method for providing bus information in real time, and a system and an application implementing the method.

The present disclosure includes a method for providing bus information in real time based on a bus stop.

The present disclosure includes a method for providing real-time bus information of a bus that is schedule to arrive at a taking stop.

An exemplary embodiment provides a method for providing real-time bus information by a terminal, the method including: receiving ultra-precise bus information about buses scheduled to arrive at a bus stop from a server; and based on the ultra-precise bus information, displaying at least one bus which moves toward the bus stop and disappears after passing the bus stop on a map area.

The bus stop may be selected from the map area, or is selected from a list screen provided as a detailed result of a bus stop search or pathfinding.

The ultra-precise bus information may include, for each route passing the bus stop, at least one of position data, a route number, a vehicle number, a vehicle speed, and a position update time of a bus scheduled to arrive.

The position data may include point position data collected at specific time interval over a designated period.

The displaying of the bus in the map area may include connecting point position data of buses included in the ultra-precise bus information to generate continuous linear data, and generating an animation that moves a bus icon of the corresponding bus along the linear data to display the moving bus.

The method may further include displaying a bus stop panel that provides information about buses scheduled to arrive at the bus stop.

The method may further include when a bus position view for a specific bus among the buses scheduled to arrive displayed on the bus stop panel is selected, highlighting and displaying the specific bus that is moving to the bus stop on the map area.

The method may further include displaying a route of the specific bus on the map area.

The method may further include: determining, based on the ultra-precise bus information, at least one target bus that is scheduled to arrive at a taking stop; and displaying, based on position data of the target bus included in the ultra-precise bus information, the target bus moving along a roadway of the map area in a direction of the taking stop. The taking stop may be a bus stop where buses of bus routes pass in a path connecting a point of departure to a destination.

The method may further include receiving the ultra-precise bus information by transmitting an identifier of the taking stop and bus route information of a bus to be taken at the taking stop to the server.

Another exemplary embodiment provides a method for providing real-time bus information by a server, the method including: receiving a request for ultra-precise bus information related to a bus stop from a terminal; checking bus routes that pass through the bus stop; extracting, based on position data of buses in operation, at least one bus heading for the bus stop from the bus routes; and transmitting ultra-precise bus information of the extracted buses to the terminal. Bon the ultra-precise bus information, buses moving toward the bus stop may be displayed on a map area.

The ultra-precise bus information may include at least one of position data, a route number, a vehicle number, a vehicle speed, and a position update time of each extracted bus.

The method may further include: receiving a request for ultra-precise bus information related to a taking stop from the terminal; extracting, based on position data of buses in operation, at least one bus scheduled to arrive at the taking stop from among bus routes available for taking at the taking stop; and transmitting ultra-precise bus information of the extracted buses to the terminal. The taking stop may be a bus stop where buses of the bus routes pass in a path connecting a point of departure to a destination.

Another exemplary embodiment provides an application stored in a non-transitory computer-readable storage medium, and comprising instructions for causing a processor to execute: receiving, from a server, ultra-precise bus information about buses scheduled to arrive at a bus stop displayed on a map area; based on the ultra-precise bus information, displaying a bus stop panel indicating information about buses scheduled to arrive at the bus stop; and based on the ultra-precise bus information, displaying at least one bus which moves toward the bus stop and disappears after passing the bus stop on the map area.

The bus stop may be selected from the map area, or is selected from a list screen provided as a detailed result of a bus stop search or pathfinding.

The ultra-precise bus information may include, for each route passing the bus stop, at least one of position data, a route number, a vehicle number, a vehicle speed, and a position update time of a bus scheduled to arrive. The position data may include point position data collected at specific time interval over a designated period.

The displaying of the bus in the map area may include connecting point position data of buses included in the ultra-precise bus information to generate continuous linear data, and generating an animation that moves a bus icon of the corresponding bus along the linear data to display the moving bus.

The application may further include instructions for causing the processor to execute: when a bus position view for a specific bus among the buses scheduled to arrive displayed on the bus stop panel is selected, highlighting and displaying the specific bus that is moving to the bus stop on the map area.

The application may further include instructions for causing the processor to execute: displaying a target bus moving in a direction of the taking stop in the map area by using position data of a bus included in the ultra-precise bus information; and receiving, from the server, new ultra-precise bus information related to the taking stop, updating the position of the target bus based on the new ultra-precise bus information, and displaying a new target bus moving in a direction of the taking stop. The taking stop may be a bus stop through which buses of the bus routes to be taken in a path connecting a point of departure to a destination pass.

The application may further include instructions for causing the processor to execute: receiving the ultra-precise bus information by transmitting an identifier of the taking stop and bus route information of a bus to be taken at the taking stop to the server.

Another exemplary embodiment provides a method of providing bus information in real time by a terminal, the method including: receiving ultra-precise bus information about at least one bus heading for a taking stop in a map area; determining at least one target bus scheduled to arrive at the taking stop based on the ultra-precise bus information; and displaying the target bus moving in a direction of the taking stop along a roadway in the map area based on position data of the target bus included in the ultra-precise bus information from a server. The taking stop may be a bus stop where buses of bus routes pass in a path connecting a point of departure to a destination.

The receiving of the ultra-precise bus information may include receiving the ultra-precise bus information by transmitting an identifier of the taking stop and information on a bus route to be taken to the server.

The method may further include extracting the identifier of the taking stop and the information on the bus route from route information connecting the point of departure and the destination and requesting for the ultra-precise bus information.

The requesting for the ultra-precise bus information may include when a route connecting the point of departure and the destination is selected and the terminal enters a screen visually showing the selected route on a map, transmitting the identifier of the taking stop shown together with the point of departure in the map area to the server.

The ultra-precise bus information may include at least one of position data, a route number, a vehicle number, a vehicle speed, and a position update time of at least one bus heading for the taking stop.

The position data may include point position data in specific time interval collected over a period of time.

The displaying of the target bus may include connecting point position data of the target bus included in the ultra-precise bus information to generate continuous linear data, and creating an animation that moves a bus icon of the target bus along the linear data to display the target bus moving on the map area.

The method may further include receiving, from the server, new ultra-precise bus information related to the taking stop during the display of the taking stop in the map area, updating the position of the target bus approaching the taking stop based on the new ultra-precise bus information, and displaying a new target bus moving in a direction of the taking stop.

The updating of the position of the target bus may include removing the target bus that has passed the taking stop from the map area based on the new ultra-precise bus information.

Another exemplary embodiment provides a method for providing bus information in real time by a server, the method including: receiving a request for ultra-precise bus information related to a taking stop from the terminal; extracting, based on position data of buses in operation, at least one bus scheduled to arrive at the taking stop from among bus routes available for taking at the taking stop; and transmitting ultra-precise bus information of the extracted buses to the terminal. Moving buses are displayed in the map area according to the ultra-precise bus information. The taking stop may be a bus stop where buses of the bus routes pass in a path connecting a point of departure to a destination.

The receiving of the request for the ultra-precise bus information may include receiving an identifier of the taking stop and bus route information of a bus to be taken at the taking stop from the terminal.

The ultra-precise bus information may include at least one of position data, a route number, a vehicle number, a vehicle speed, and a position update time of the extracted bus.

Another exemplary embodiment provides an application stored in a computer-readable storage medium, the application including instructions for executing: displaying a map area; receiving ultra-precise bus information about at least one bus scheduled to arrive at a taking stop of the map area from a server; displaying a target bus moving in a direction of the taking stop in the map area by using position data of a bus included in the ultra-precise bus information; and receiving, from the server, new ultra-precise bus information related to the taking stop, updating the position of the target bus based on the new ultra-precise bus information, and displaying a new target bus moving in a direction of the taking stop. The taking stop is a bus stop through which buses of the bus routes to be taken in a path connecting a point of departure to a destination pass.

The receiving of the ultra-precise bus information may include receiving the ultra-precise bus information by transmitting an identifier of the taking stop and bus route information of a bus to be taken at the taking stop to the server.

The receiving of the ultra-precise bus information may include extracting the identifier of the taking stop and the information on the bus route from route information connecting the point of departure and the destination and transmitting the extracted identifier of the taking stop and the information on the bus route from route information to the server.

The receiving of the ultra-precise bus information may include when a route connecting the point of departure and the destination is selected and the terminal enters a screen visually showing the selected route on a map, transmitting the identifier of the taking stop shown together with the point of departure in the map area to the server.

The ultra-precise bus information may include at least one of position data, a route number, a vehicle number, a vehicle speed, and a position update time of the bus schedule to arrive at the taking stop.

The position data may include point position data in specific unit collected over a period of time.

The target bus moving in the direction of the taking stop may be displayed as a bus animation in which a bus icon moves according to linear data generated by the connection of the point position data in the map area.

The application may further include instructions for executing removing the target bus that has passed the taking stop from the map area based on the new ultra-precise bus information.

According to the exemplary embodiment, while conventional methods provide the estimated arrival time for scheduled bus routes at a bus stop, the present disclosure may provide the real-time position of a bus that is scheduled to arrive at a bus stop through an animated representation on a map, and provide various information including the route for the selected bus.

According to the exemplary embodiment, it is possible to display the buses moving naturally along the roadway on the map.

According to the exemplary embodiment, the user may continuously track the position of the bus scheduled to arrive at a particular bus stop on the map, and check the route of the selected bus on the map.

According to the exemplary embodiment, with the implementation of real-time bus position tracking, users may identify the positions of the buses scheduled to arrive at the taking stop along the chosen route in the pathfinding mode. This allows for intuitive visualization, enabling users to quickly determine the positions of the buses scheduled to arrive. By selecting a bus that is available for boarding, users may conveniently review the bus route information, and make informed decisions about their travel options.

According to the exemplary embodiment, users may obtain various real-time bus information, such as continuously monitoring the position of the earliest bus scheduled to arrive at the taking stop on the map, and monitoring the positions of buses scheduled to arrive at the taking stop within a certain period of time on the map all at once according to the set conditions, or monitoring the positions of buses of a certain route scheduled to arrive at the taking stop. This comprehensive information empowers users to make informed decisions while using the pathfinding mode, allowing them to select suitable buses to get to the destination.

DETAILED DESCRIPTION OF THE EXEMPLARY EMBODIMENTS

Figure 1:
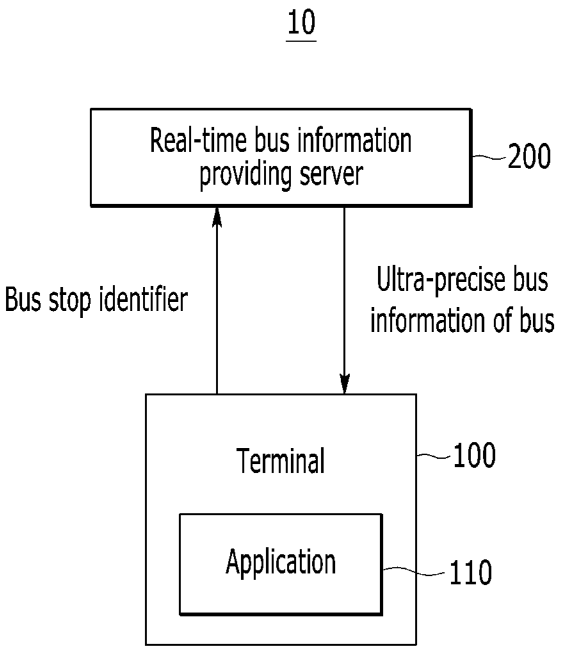
FIG. 1 is a schematic diagram illustrating a real-time bus information providing system according to an exemplary embodiment.

Hereinafter, exemplary embodiments of the present invention will be described with reference to accompanying drawings so as to be easily understood by a person ordinary skilled in the art. The present disclosure can be variously implemented and is not limited to the following exemplary embodiments. In addition, in order to clearly explain the present description in the drawings, parts irrelevant to the description are omitted, and similar parts are denoted by similar reference numerals throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

A server may include one or more processors, memory for loading computer programs executed by the processors, storage devices for storing the computer programs and various data, and communication interfaces. In addition, the server may further include various components. A processor is a device that controls the operation of a server and may be various forms of processor that processes instructions contained in a computer program, and may include, for example, at least one of a Central Processing Unit (CPU), a Micro Processor Unit (MPU), a Micro Controller Unit (MCU), a Graphic Processing Unit (GPU), or any other form of processor well known in the art of the present disclosure. The memory stores various data, instructions, and/or information. The memory may load a corresponding computer program from the storage device such that the instructions described to execute the operations of the present disclosure are processed by the processor. The memory may be, for example, Read Only Memory (ROM) and Random Access memory (RAM). The storage devices may non-temporarily store computer programs and various data. The storage device may include a non-volatile memory, such as a Read Only Memory (ROM), an Erasable Programmable ROM (EPROM), an Electrically Erasable Programmable ROM (EEPROM), a flash memory, or the like, a hard disk, a removable disk, or any other form of computer-readable recording medium well known in the art to which the present disclosure belongs. The communication interface may be a wired/wireless communication module that supports wired/wireless communication. A computer program may include instructions executed by the processor, and may be stored on a non-transitory computer readable storage medium, and the instructions cause the processor to execute the operation of the present disclosure.

A terminal includes an application/program, which is software stored on a computer-readable storage medium, and hardware, such as processors, memory, displays, and communication modules. The processor works with the hardware to run the application. The display may display a screen of a user interface provided by the application, and may receive user input, for example, touch input. The communication module communicates with the server through a communication network. The terminal may be implemented in a variety of forms, and the present disclosure will be described based on a mobile terminal as an example, but the terminal may be implemented in pad-type terminals, such as smart pads, computers of various types, such as laptop computers, wearable devices, TV terminals, and the like.

An application is software stored on a non-transitory computer-readable storage medium and includes instructions and data to execute the operations of the present disclosure. The application is installed on the terminal, runs on the terminal, and communicates with the specified server through the communication network.

While the description primarily refers to providing real-time bus information, the methods described herein may also be applied to transportation means that moves along a fixed route and passes through stops, such as a subway.

Various exemplary embodiments are described in the present disclosure, and various exemplary embodiments may be combined to form new exemplary embodiments.

FIG. 1 is a schematic diagram illustrating a real-time bus information providing system according to an exemplary embodiment.

Referring to FIG. 1, a real-time bus information providing system 10 may provide a real-time bus information service that displays real-time movements of buses on a map, based on up-to-the-second updates of bus positions. The real-time bus information providing system 10 may include a terminal 100 and a real-time bus information providing server (simply referred to as the "server") 200.

The terminal 100 includes an application 110 that communicates with the server 200. The terminal 100 executes the application 110 and performs the operations of the present disclosure in conjunction with the server 200.

The application 110 may include instructions for providing real-time bus information in conjunction with the server 200, and display an interface screen exemplarily described in the present disclosure. The application 110 may be, for example, an application for a map service that provides a pathfinding service based on transportation means, a navigation service, and so on. The application 110 may provide the real-time bus information service, which can be accessed through a dedicated menu, or may additionally integrate the real-time bus information service into existing services, such as a pathfinding service or a navigation service. In describing the present disclosure, the terminal 100 executing the application 110 may be described as the subject of the operation, or the application 110 running on the terminal 100 may be described as the subject of the operation, as needed.

In the following, the real-time bus information service of the present disclosure may be referred to as an ultra-precise bus service, distinguishing it from existing services that solely provide bus arrival times. The real-time bus information may be referred to as ultra-precise bus information. Furthermore, the buses for which the real-time bus information is provided may be referred to as ultra-precise buses, emphasizing their real-time tracking capabilities. The ultra-precise bus is represented by a bus icon on the map. The bus icon may move in real time on the map, reflecting the actual position data of the bus.

The terminal 100 may transmit a bus stop identifier selected on the screen to the server 200 to receive ultra-precise bus information that is scheduled to arrive at the bus stop. Bus stops can be selected from the map area, or may be selected from the list screen provided as a detailed result of a bus stop search or pathfinding. Additionally, the terminal 100 may periodically call the server 200 to obtain the latest ultra-precise bus information about the bus stop identifier, update the bus information displayed on the screen based on the ultra-precise bus information, and display buses moving in real time.

The ultra-precise bus information may include position data of a bus scheduled to arrive at a bus stop along a route, and may further include a route number, a vehicle number, vehicle speed, position update time, and the like. The ultra-precise bus information may include position data of a bus by route, and may include position data for multiple buses along a route. In addition, the ultra-precise bus information may further include service areas, such as Jeju and Seoul, and bus types, such as branch line buses, trunk line buses commonly known as blue color buses in Korea, and village buses. The ultra-precise bus information may include point position data collected at specific time intervals, such as every one second, over a designated period, such as five seconds. The ultra-precise bus information may further include a bus route, a list of bus stops to which the corresponding bus on the route is headed, and the list of bus stops may be sorted in order of proximity to the bus. The ultra-precise bus information may include an estimated time of arrival (for example, two minutes in advance) to the bus stop for each position data. The estimated time of arrival may also be calculated by the terminal 100 based on the position data and vehicle speed.

Based on the ultra-precise bus information, the terminal 100 may display at least one bus moving toward the bus stop in the map area. While the selected bus stop is displayed on the screen, the terminal 100 may generate and play a bus animation that shows a bus moving smoothly and in real time along the roadway by using the ultra-precise bus information obtained periodically. For example, the terminal 100 may generate a 5-second animation of each bus by using ultra-precise bus information at 5-second intervals.

The terminal 100 may not display buses that have already passed the bus stop on the map screen. Instead, the terminal 100 may display new buses scheduled to arrive on the map screen. To ensure that both the selected bus stops and the buses scheduled to arrive are visible on the map screen, the terminal 100 may adjust the map scale or move the map. This allows for optimal visibility and ensures that the bus stops and the buses scheduled to arrive are displayed on the same screen. However, there may be cases where the distance between the bus stop and the bus scheduled to arrive exceeds certain criteria. In such situations, the terminal may not display the bus stop and the bus scheduled to arrive on the map screen.

The terminal 100 may display a bus stop panel that provides information about buses passing through the bus stop. The bus stop panel is displayed when a bus stop is selected, and the bus stop may be selected on the map screen, or selected from the list screen provided as a detailed result of a bus stop search or pathfinding.

The bus stop panel may show the estimated time of arrival of the bus on the bus routes that pass through the bus stop.

If no buses are currently operating on a particular bus route, no buses are scheduled to arrive at the bus stop within a certain timeframe, or is the bus route does not provide position data, the bus route may not be displayed in the bus stop panel, or the status of the corresponding bus route may be provided in the bus stop panel. In this case, the bus stop panel can prioritize displaying buses moving toward a bus stop in the map area.

The bus stop panel may display a bus stop name, a bus stop identifier, and route-specific bus information on a bus that is scheduled to arrive at the bus stop. The bus stop panel may display bus information sorted by order of arrival. The bus information may include at least one of a route number, a vehicle number, a vehicle attribute (for example, low-floor bus, and ultra-precise bus), estimated time of arrival, vehicle speed, update time. Some of the bus information (for example, route number, vehicle number, vehicle speed, update time) may be displayed as a pop-up message near a bus icon moving on the map. The estimated time of arrival informed in the bus stop panel is constantly updated.

The bus stop panel may provide a bus position view function, allowing users to focus on the position and movement of a specific bus. When the bus position view for a specific bus is selected, the corresponding bus traveling to the bus stop may be highlighted and displayed in the map area. For example, the terminal 100 may display only the bus for which the position view is selected without displaying other buses scheduled to arrive, may apply visual effects to the selected bus to highlight the bus, may display the bus stop and the selected bus in the map area, and may further display the route of the additionally selected bus in the map area. To ensure visibility of both the bus stop and the selected bus, the terminal 100 may change the map scale or move the map to adjust for the bus stop and the bus, depending on the distance between the bus stop and the selected bus. The terminal 100 may display a pop-up message near the selected bus indicating the route number, the vehicle number, vehicle speed, update time, and the like. To indicate that the bus has been selected, the terminal 100 may display a visual effect near the selected bus. When the bus position view is released or deactivated, the highlighted markers for the selected buses are removed, and the map screen may revert to displaying the real-time movement of buses that are scheduled to arrive at the bus stop.

When a moving bus is selected in the map area, the terminal 100 may display the route of the selected bus on the map and provide a driving mode in which the selected bus drives (navigates) the route of the selected bus. The terminal 100 may call an API to track the selected bus. The map may be adjusted so that the bus position obtained through the API becomes the center of the map area, and display the bus moving along its designated route on the screen. To clearly distinguish the selected bus in the driving mode, the terminal 100 may apply a visual effect on the bus icon or around the bus icon.

The terminal 100 may generate a bus animation that moves in real time on the map according to the real-time position data of the buses received from the server 200 to naturally move the bus icon on the map. To achieve this, the terminal 100 may generate continuous linear data from the point position data contained in the ultra-precise bus information. This involves generating a smooth trajectory by connecting the position points. The terminal 100 may combine an unmoved portion in the continuous linear data created in the previous cycle with the continuous linear data of the current cycle. The terminal 100 may then progressively move the bus icon on the screen along the continuous linear data. In this case, the terminal 100 may generate an animation in which the bus naturally rotates and moves by applying a curve algorithm to the connecting portion of the continuous linear data. In this case, the terminal 100 may receive a bus route from the server 200 and generate continuous linear data moving along the bus route. If a user action, such as moving the screen, interrupts the ongoing bus animation in the current cycle, the bus animation for the current cycle needs to be played again. The terminal 100 may quickly resume playing the bus animation from the interrupted position data, or skip to the point where the current position data was skipped.

On the other hand, it is possible for network issues or GPS problems to result in inaccurate position data to be collected. This can lead to undesirable animations, such as reverse animations or rotating animations. Thus, the server 200 may remove abnormal data from the source position data, such as sudden and drastic changes in direction of travel or rapid shifts in position. That is, when the direction of travel changes drastically beyond the reference or is reversed, or the position data indicates an abnormal position, the server 200 may determine the cases as abnormal position data and remove the abnormal position data. The terminal 100 may generate linear data based on ultra-precise bus information from which the abnormal data has been removed. On the other hand, the terminal 100 generates linear data in which continuous position data of each bus are connected, and when the direction of travel changes rapidly beyond the reference or is reversed, or when the position data indicates an abnormal position, the terminal 100 may generate the bus animation after removing the abnormal position data. When the direction calculated based on the last position of the previous cycle and the first position of the current cycle changes rapidly by a reference value or more, the terminal 100 may determine that the position data is inaccurate position data and discard the inaccurate position data.

The server 200 obtains information from the application 110 running on the terminal 100 and provides information necessary to configure the terminal screen. Specifically, the server 200 manages public transportation information, such as bus routes, bus stops, and service information in each region. When the server 200 receives a request from the terminal 100 for ultra-precise bus information about a bus stop identifier, the server 200 checks the bus routes of the buses that pass through that corresponding bus stop. Based on the position data of buses in operation, the server 200 extracts buses heading for the bus stop by a bus route and transmits ultra-precise bus information including the position data of the buses to the terminal 100. The ultra-precise bus information may include each bus's route number, vehicle number, vehicle speed, position update time, service area, bus type, and estimated time of arrival at the bus stop. The ultra-precise bus information may further include a route, a list of bus stops to which the bus on the route is headed, and the list of bus stops may be sorted in order of proximity to the bus.

The source position data of the buses in operation may be obtained from the local government system in the service area that manages the operation information of the buses. Since bus position data is collected in a system that is not the same for each local government system, the server 200 may convert the bus position data collected for each operating region, such as Jeju, Busan, and Seoul, a common standardized position data and generate ultra-precise bus information. The server 200 may assign unique vehicle identifiers to buses in each operating region with route numbers and vehicle numbers to uniquely identify and manage buses operating across the country.

In this case, the server 200 may remove position data that is less reliable or outdated. Further, since the position data of the buses waiting in the garage does not need to be provided to the user, the server 200 may remove the position data of the unoperated buses.

When bus position information is requested for a specific bus, the server 200 may provide the position data, route, and the like of the corresponding bus to the terminal 100, and may continue to provide updated position data. In addition, when a specific bus starts travelling, the server 200 may provide the position data, route, and the like of the corresponding bus to the terminal 100 and may continue to provide updated position data.

In the following, various interface screens provided by the application 110 executed on the terminal 100 will be described.

Figure 2:
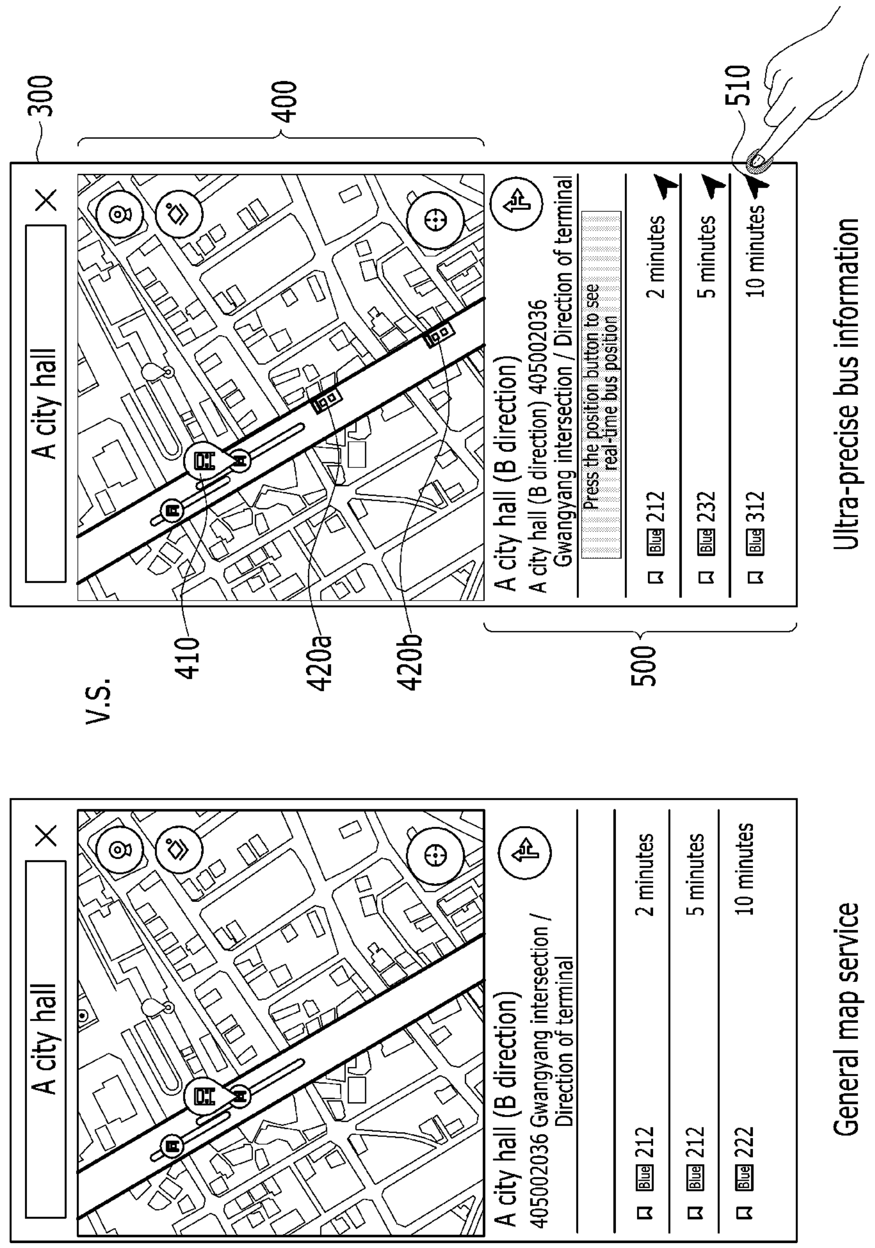
FIGS. 2 to 4 are diagrams illustrating examples of a real-time bus information providing screen according to the exemplary embodiment.
Figure 3:
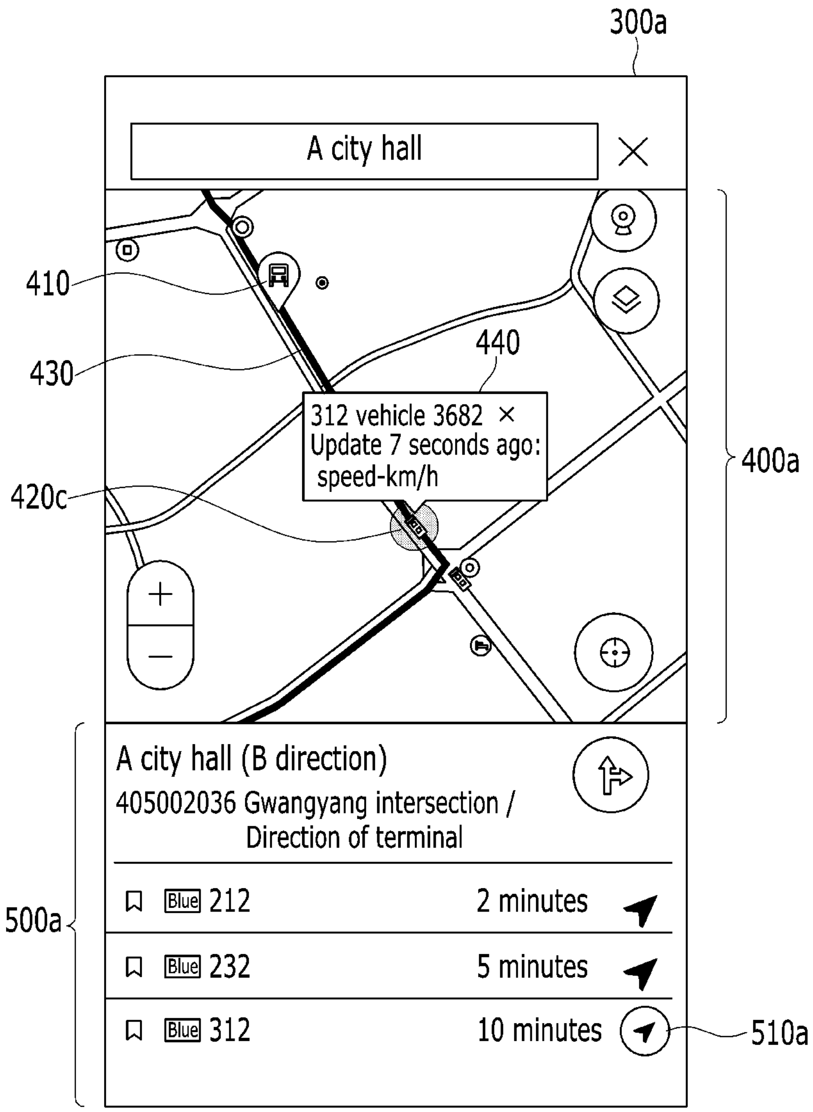
Figure 4:
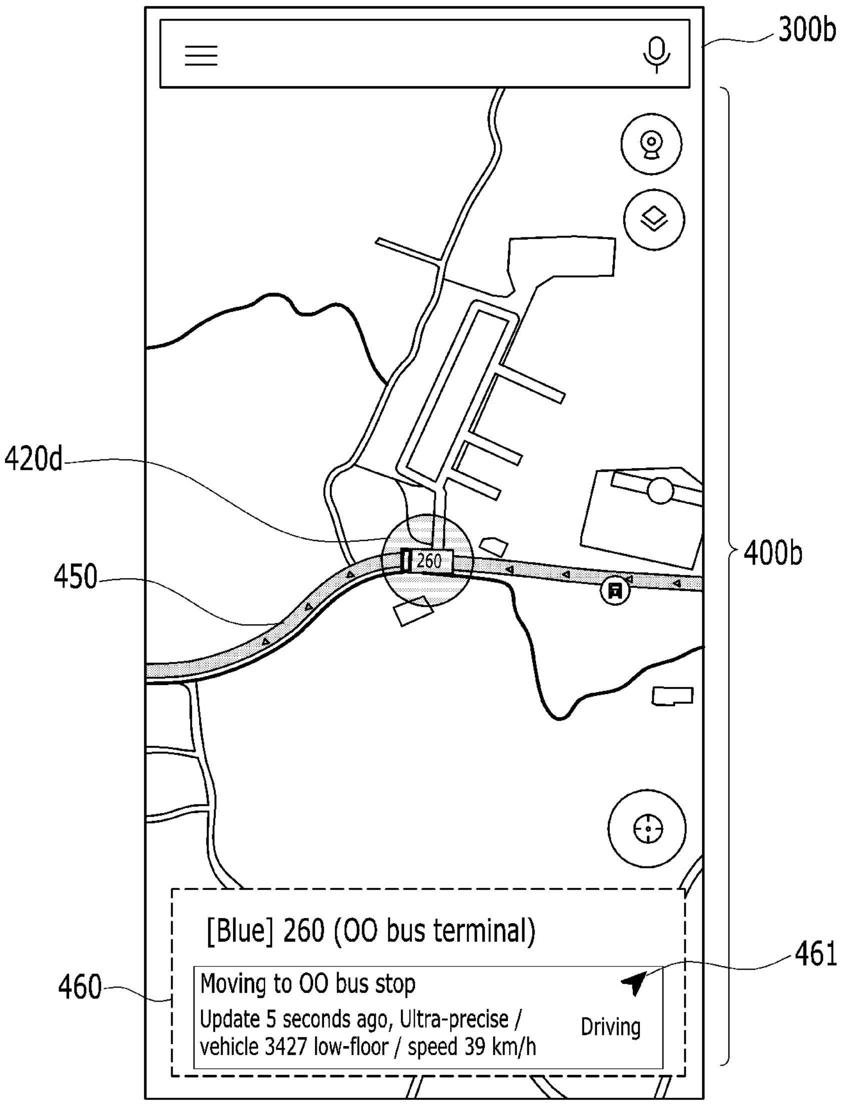

FIGS. 2 to 4 are diagrams illustrating examples of a real-time bus information providing screen according to the exemplary embodiment.

Referring to FIG. 2, a typical map service that does not provide ultra-precise bus information simply provides the estimated arrival times of buses that pass through the bus stop.

In contrast, in the case of an application that provides ultra-precise bus information, the terminal 100 may receive ultra-precise bus information scheduled to arrive at a bus stop from the server 200, and may display information related to the bus stop on the screen 300 based on the information.

In particular, the terminal 100 may display a map area 400, in which bus icons 420*a* and 420*b* moving toward the bus stop 410 are displayed, on the screen 300. The bus icons 420*a* and 420*b* displayed in the map area 400 move in real time based on the position data included in the ultra-precise bus information.

In addition, the terminal 100 may display a bus stop panel 500 that provides information about buses passing through the bus stop 410 on the screen 300. The bus stop panel 500 may display the name of the bus stop, "A city hall (direction B)", the bus stop identifier, "405002036", and the estimated time of arrival for each route scheduled to arrive at the bus stop. The method for displaying, by the terminal 100, bus routes scheduled to arrive at the bus stop on the bus stop panel 500 may be various. For example, the bus stop panel 500 may display bus information arranged in order of arrival, or may prioritize displaying bus information corresponding to the moving bus icons 420*a* and 420*b* in the map area 400, or may prioritize displaying bus information saved as a user favorite.

The bus stop panel 500 may include a bus position view button 510. When the bus position view button 510 is pressed, a notification or prompt may be displayed indicating that the real-time bus position can be viewed. For example, upon selecting the bus position view button 510 for a specific bus, such as bus number 312, the bus traveling to the bus stop may be highlighted and visually distinguished on the map screen. The visual representation or highlight method used to display bus number 312 in the map area 400 may vary.

Referring to FIG. 3, the terminal 100 may display the position of bus number 312 for which the bus position view button 510 is selected on screen 300*a*. The bus stop panel 500*a* may display the activated bus position view button 510*a* for the selected bus, indicating that the bus position view is active. Additionally, the bus stop panel 500*a* may continuously update the arrival information for the bus route.

A bus icon 420*c* representing bus number 312 approaching the bus stop 410 may be displayed in the map area 400*a*. In this case, the terminal 100 may adjust the map scale, allowing both the bus stop 410 and the bus icon 420*c* to be visible within the map area 400*a* simultaneously.

The terminal 100 may display the route 430 of bus number 312 in the map area 400*a*.

The terminal 100 may give a visual effect to the region near the selected bus to emphasize that the bus icon 420*c* is the bus for which the position view is selected. For example, the terminal 100 may provide visual effects to make the circle surrounding the bus icon blink, or modify the size of the bus icon.

The terminal 100 may display a pop-up message 440 near the bus icon 420*c*. The pop-up message 440 may include a route number, vehicle number, vehicle speed, update time, and the like.

When the activated bus position view button 510*a* is released or deactivated, the highlighted markings for selected bus number 312 will be removed. The map area 400 may display bus icons that move in real time toward the bus stop 410, as shown in FIG. 2.

When the first bus of the bus route for which the position view is selected arrives at the bus stop 410, the activated position view button may be inactivated and the bus stop panel may guide the arrival information of the next bus scheduled to arrive at the bus stop 410.

On the other hand, the terminal 100 may not inactivate the bus position view button 510*a* for bus number 312. In this case, since the server 200 does not provide position data for buses that have passed the bus stop, the bus icon 420*c* for vehicle number 3682 may continue to move along the route and then disappear after passing the bus stop 410. Further, a new bus icon representing bus number 312 may appear on the map and continue to move along the route. The terminal 100 may adjust the map scale to ensure that both the new bus icon for bus number 312 and the bus stop 410 are visible in the map area 400*a*. In this way, the user may track the position and the estimated time of arrival of next bus, bus number 312, even though the previous bus number 312 passes by the bus stop. That is, the terminal 100 may display new bus icon for bus number 312 in the map area 400*a* based on the position data of bus number 312 included in the ultra-precise bus information received from the server 200.

Referring to FIG. 4, a moving bus icon 420*d* may be selected in the map area.

The terminal 100 may then display a selected bus icon 420*d*, a route 450, and a bus information panel 460 on a screen 300*b*. The terminal 100 may adjust the scale level of the map area 400*b* to display the basic information of the selected bus icon 420*d*.

The selected bus icon 420*d* may move along the route 450 and may display a visual effect, such as a highlighted circular area, to indicate that the bus is the selected bus. When the selected bus icon 420*d* belongs to route number 260, the bus icon 420*d* may show the route number for easy identification. And, As the bus icon 420*d* approaches a bus stop over time, the terminal 100 may display a marker indicating the bus stop on the screen 300*b*, or display estimated arrival information on the bus stop panel 460.

The bus information panel 460 may display a route number, vehicle number, vehicle speed, update time, vehicle attributes (for example, low-floor bus, and ultra-precise bus), and may indicate the direction of travel of the bus or the stop the bus is traveling to. In addition, the bus information panel 460 may include a drive button 461 to initiate driving (navigation) mode on the route. When the drive button 461 is selected, the bus icon 420*d* may be disposed at a designated position, such as the center of the screen, to serve as a reference point for the map area. The screen may display the map area moving over time to simulate the experience of driving on the bus route. That is, when the bus icons are moving in a fixed map area, and the bus starts to drive, a specific bus icon is positioned at the center in the map area, and the map area moves in the opposite direction based on the bus icon's position data, so that a bus driving screen may be displayed. This creates the illusion that the user is traveling on the bus, similar to how a typical navigation program guides a driver in a car. The driving mode aims to provide users with an immersive experience as they virtually move along the bus route.

When the close button (not shown) is selected in the bus information panel 460, the driving mode may be released. The route line and the focused bus stop may then disappear, and the display may revert to the screen in which the bus ions are moving in the map area as before. This allows users to exit the driving mode and return to the regular map view where they can continue tracking the real-time movements of the buses.

Figure 5:
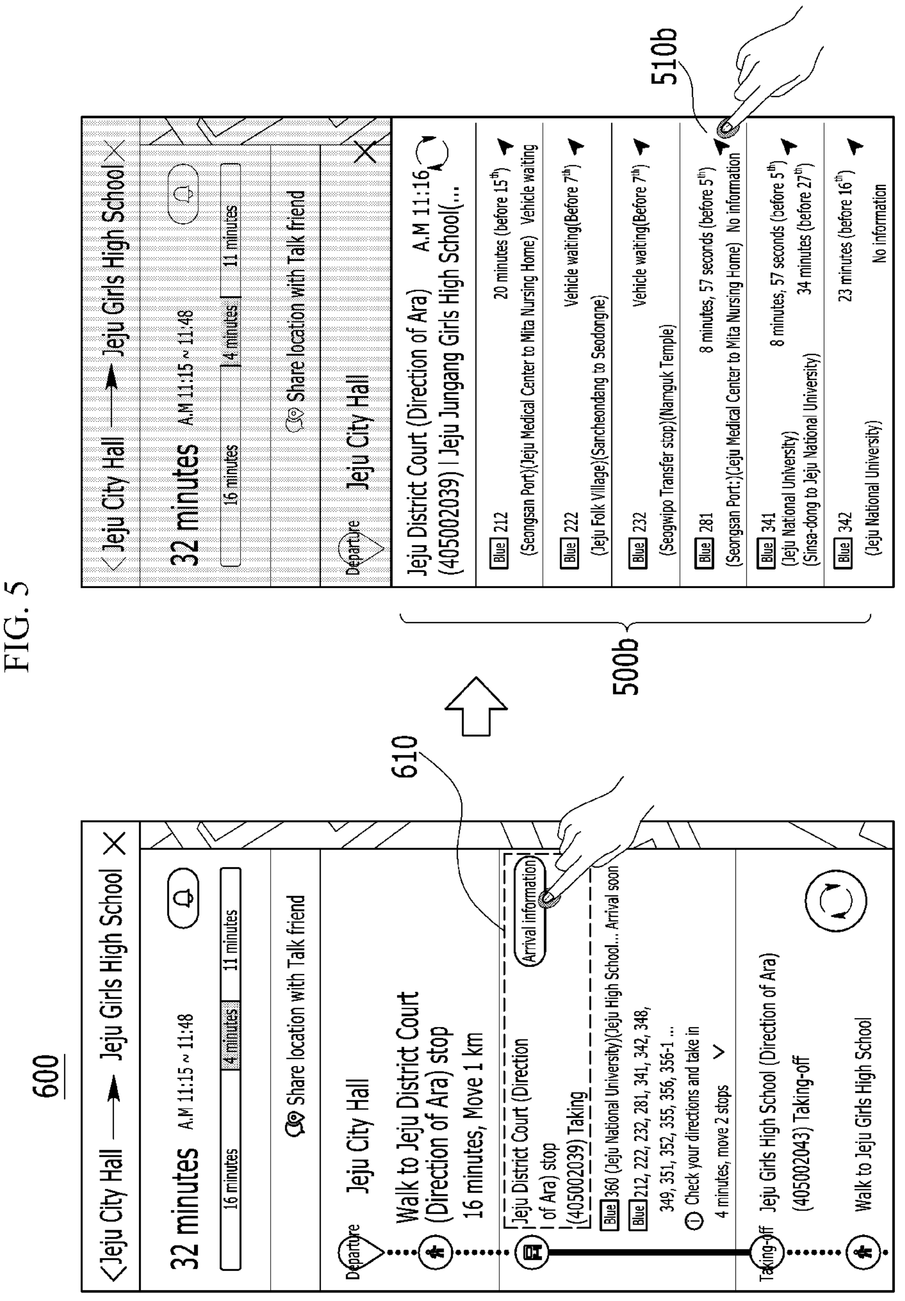
FIGS. 5 and 6 are diagrams illustrating examples of a real-time bus information providing screen in a pathfinding mode according to the exemplary embodiment.
Figure 6:
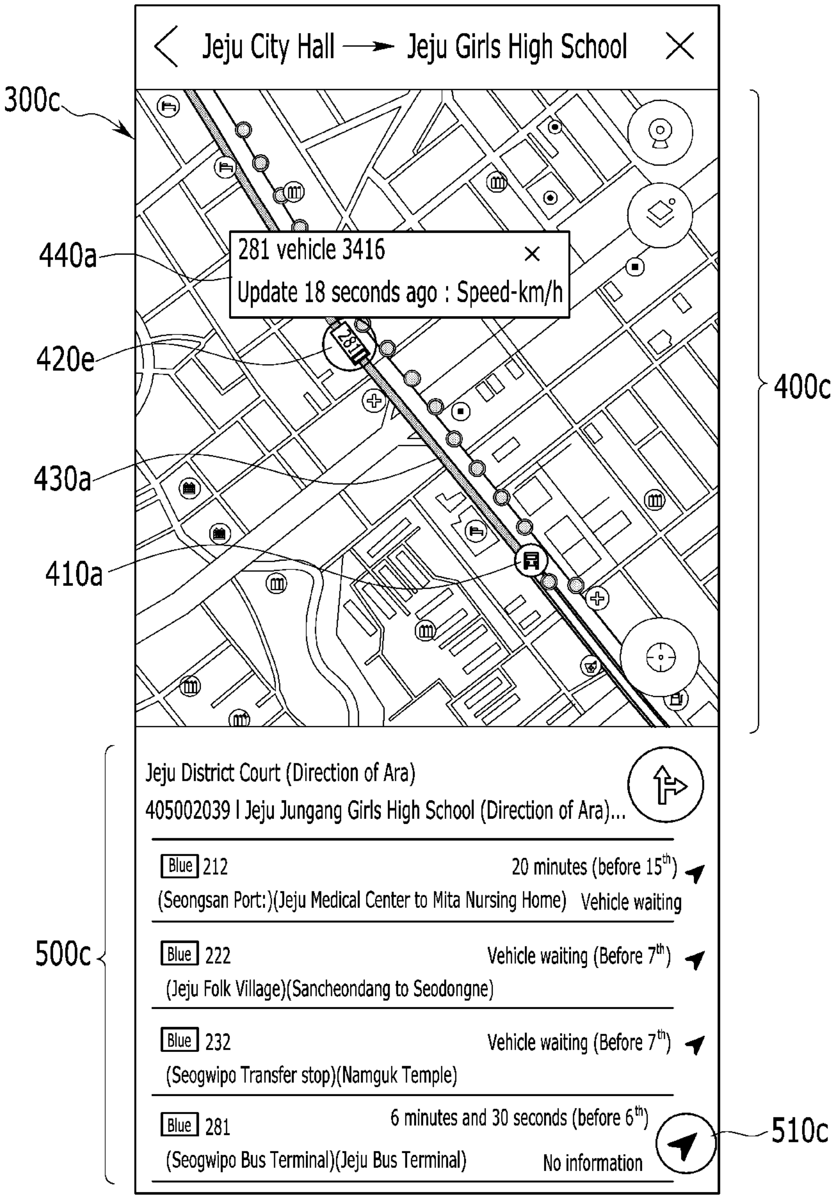

FIGS. 5 and 6 are diagrams illustrating examples of a real-time bus information providing screen in a pathfinding mode according to the exemplary embodiment.

Referring to FIG. 5, the terminal 100 may receive various route information according to the public transportation means from the server 200 when a departure and a destination are input in the pathfinding mode, and display the various path information as pathfinding results. The terminal 100 may provide route information, such as travel time by route, taking/transfer/arrival stops, a list of bus routes to be taken, and arrival time, on a list screen, and when a predetermined route is selected on the list screen, the terminal 100 may enter the map screen that may provide detailed route information, and visually show the route on a map.

For example, in the pathfinding mode, when a route that takes 32 minutes is selected from Jeju City Hall, to a destination, Jeju Girls High School, the terminal 100 may display a detailed route screen 600. The detailed route screen 600 may provide a step-by step guide for journey, including walking directions from Jeju City Hall to the Jeju District Court stop, taking a bus from the Jeju District Court stop, and getting off at the Jeju Girls High School stop. In addition, the detailed route screen 600 may display information about the available buses that the user can take at the Jeju District Court stop.

When the user selects the Jeju District Court stop 610, a bus stop panel 500*b* may be displayed on the screen 600 that provides information about buses that travel through the selected bus stop. The bus stop panel 500*b* may display information about the buses that the user needs to take to reach the destination, and may display overall bus information that passes through the Jeju District Court stop. The bus stop panel 500*b* may separate out and display the buses that the user needs to take to get to the destination from the total number of buses.

The bus stop panel 500*b* may display the name of the bus stop, Jeju District Court (direction of Ara), the bus stop identifier 405002039, and the estimated time of arrival for each route scheduled to arrive at the bus stop. The method for displaying, by the terminal 100, a bus route scheduled to arrive at the bus stop on the bus stop panel 500*b* may be various. The bus stop panel 500*b* may include a bus position view button. For example, the bus position view button 510*b* for bus number 281 may be selected.

On the other hand, when user selects the bus position view button of a specific bus route from among the bus information provided in the pathfinding mode and switches to the map screen, the terminal 100 may display buses moving in real time in the map area. The range of buses displayed on the map may be determined in different ways. For example, along with the bus for which the position view has been selected, the entire buses moving on the roadway in the map area may be displayed. Alternatively, in addition to the bus for which the position view has been selected, the buses that pass through at least one stop indicated in the pathfinding results may be displayed, and buses that are guided for taking in the pathfinding results may be displayed. In this case, the terminal 100 may display an icon of the bus for which the bus position view button has been selected or a route for which the bus position view button has been selected to be distinguished from other buses.

Referring to FIG. 6, when the bus position view button 510*c* of bus number 281 is selected, the terminal 100 may display the real-time position of bus number 281 on a screen 300*c* that includes a map area. The screen 300*c* may include a map area 400*c* displaying an bus icon 420*e* representing bus number 281 traveling to Jeju District Court stop 410*a*, and a bus stop panel 500*c* of Jeju District Court stop 410*a*. The bus stop panel 500*c* may display the activated bus position view button 510*c*, and may display arrival information for the bus route that is updated over time.

On the other hand, the bus for which the bus position view button is selected may be either the bus that the user was guided to take in the detailed route during the pathfinding, or any bus that simply passes through the Jeju District Court (direction of Ara) bus stop regardless of the pathfinding results. To differentiate between these cases, the terminal 100 may display the bus for which the bus position view button is selected separately from the general bus that simply passes through the Jeju District Court (direction of Ara) bus stop on the map area 400*c*. This allows users to easily identify whether the approaching bus is the one the users need to take based on the bus route displayed on the map.

The terminal 100 may display a bus icon 420*e* in the map area 400*c* of bus number 281 approaching the bus stop 410*a*. At this time, the terminal 100 may change the map scale so that the bus stop 410*a* and the bus icon 420*e* are visible together in the map area 400*c*. The map area 400*c* may separately display the route 430*a* of bus number 281 along with the overall route from the departure to the destination, such as walking from Jeju City Hall to Jeju District Court stop 610 and taking the bus at Jeju District Court stop 610.

The terminal 100 may display a visual effect near the selected bus to emphasize that the bus icon 420*e* is the selected bus. For example, the terminal 100 may provide visual effects, such as the blinking of the circle including the bus icon, and the change in the size of the bus icon.

The terminal 100 may display a pop-up message 440*a* near the bus icon 420*e*. The pop-up message 440*a* may include a route number, vehicle number, vehicle speed, update time, and the like.

When the activated bus position view button 510*c* is released or inactivated, the highlighted markings for the selected bus number 281 are removed, and the screen 300*c* may enter a map screen that visually shows the route from the departure to the destination on a map.

As also described in FIG. 3, the bus position view button 510*a* for bus number 281 may not be inactivated by the user. In this case, since the server 200 does not provide position data for buses that have passed the bus stop, the bus icon 420*e* may continue to move along the route and then disappear after passing the bus stop 410*a*. The terminal 100 may automatically inactivate the bus position view button 510*a* that is activated on the bus stop panel 500*a*.

Alternatively, the bus icon 420*e* of vehicle number 3416 may continue to move along the route and then disappear after passing the bus stop 410. Further, the new bus icon of bus number 312 may move along the route, and the terminal 100 may change the map scale so that new bus number 312 and the bus stop 410 are visible in the map area 400*a*. In this case, the user may know the position and the estimated time of arrival of next bus number 312 even though bus number 312 passes by the bus stop. That is, the terminal 100 may display new bus icon of bus number 312 in the map area 400*a* based on the position data of bus number 312 included in the ultra-precise bus information received from the server 200.

When the moving bus icon 420*e* is selected in the map area 400*c*, the vehicle may enter the driving mode. As shown in FIG. 4, the terminal 100 may display a selected bus icon 420*e*, a route, and a bus information panel on the screen. The selected bus icon 420*e* may move along the route and a visual effect, such as a highlighted circular area, to indicate that the bus is the selected bus may be displayed. When a driving start is requested for the bus icon 420*e*, the bus icon 420*e* may be disposed at a designated position, such as the center of the screen, to serve as a reference point for the map area The screen may display the map moving over time to simulate the experience of driving on the bus route. That is, when the bus icons are moving in a fixed map area and the bus enters the driving mode, a specific bus icon is positioned at the center in the map area, and the map area moves in the opposite direction based on the bus icon's position data, so that a bus driving screen may be displayed.

Figure 7:
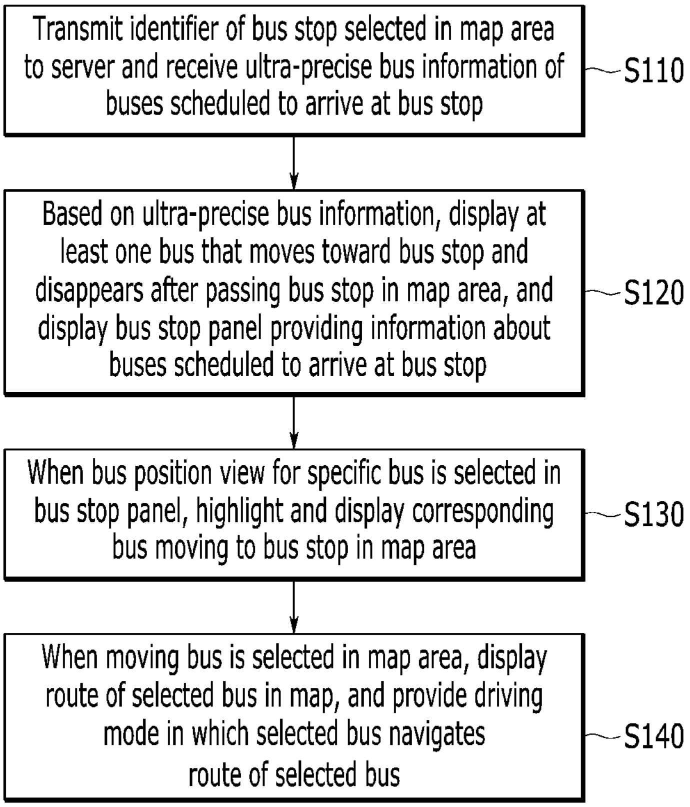
FIG. 7 is a flowchart illustrating a real-time bus information providing method by a terminal according to an exemplary embodiment.

FIG. 7 is a flowchart illustrating a method for providing bus information in real time by a terminal according to an exemplary embodiment.

Referring to FIG. 7, the terminal 100 displays a map area and transmits a bus stop identifier selected from the map area to the server 200 to receive ultra-precise bus information of buses scheduled to arrive at the bus stop (S110). The terminal 100 may obtain, from the server 200, ultra-precise bus information for the selected bus stop identifier. The bus stop may be selected from the map area, or selected from a list screen provided as a detailed result of a bus stop search or pathfinding. The ultra-precise bus information may include position data of a bus scheduled to arrive by route passing a bus stop, and may further include a route number, a vehicle number, vehicle speed, position update time, service areas, and type of bus, and the like. The ultra-precise bus information may include point position data collected at specific time interval, such as every one second, over a designated period, such as five seconds. The ultra-precise bus information may further include a route, a list of bus stops to which the corresponding bus on the route is headed, and the list of bus stops may be sorted in order of proximity to the bus. The ultra-precise bus information may include an estimated time of arrival (for example, two minutes in advance) to the bus stop for each piece of position data. The estimated time of arrival may also be calculated by the terminal 100 based on the position data and vehicle speed.

Based on the ultra-precise bus information, the terminal 100 displays at least one bus that moves toward the bus stop and disappears after passing the bus stop in the map area, and displays a bus stop panel that provides information about buses that are scheduled to arrive at the bus stop (S120). At least some of the buses schedule to arrive displayed on the bus stop panel may be represented by moving bus icons in the map area. The terminal 100 may generate and play a bus animation that shows a bus moving smoothly and in real time along the roadway by using the ultra-precise bus information obtained periodically. The terminal 100 may display information about buses scheduled to arrive at the selected bus stop in the bus stop panel, while displaying at least one bus moving toward the selected bus stop in the map area. The bus stop panel may display a bus stop name, a bus stop identifier, and route-specific bus information on a bus that is scheduled to arrive at the bus stop. On the other hand, the terminal 100 may display buses moving along a roadway in the map area after removing abnormal position data, such as sudden and drastic changes in direction of travel or rapid shifts in position, from the position data included in the ultra-precise bus information. The terminal 100 may display buses moving along the roadway by gradually moving a bus icon corresponding to each bus along linear data in which continuous position data are connected to generate a bus animation, and playing the bus animation on a higher layer of the map area. In this case, the terminal 100 may display buses moving along the roadway by using bus icons of a size and shape specified by the scale level. The terminal 100 may display a route number on a moving bus icon in the map area.

When the bus position view is selected for a specific bus in the bus stop panel, the terminal 100 highlights and displays the corresponding bus that is traveling to the bus stop in the map area (S130). To indicate that the bus has been selected, the terminal 100 may apply a visual effect near the selected bus. The terminal 100 may display a pop-up message near the selected bus indicating the route number, the vehicle number, vehicle speed, update time, and the like. The terminal 100 may display a route of the selected bus on the map area.

When a moving bus is selected in the map area, the terminal 100 may display the route of the selected bus on the map and provide a driving mode in which the selected bus navigates the route of the selected bus (S140).

On the other hand, a bus stop may be selected in the map area, but the bus stop may also be selected in the list screen provided as a detailed result of a bus stop search or pathfinding. The terminal 100 may receive the ultra-precise bus information related to the bus stop from the server 200, display at least one bus that moves toward the bus stop and disappears after passing the bus stop in the map area based on the ultra-precise bus information, and display a bus stop panel that provides information about buses that are scheduled to arrive at the bus stop. When the bus position view for a specific bus is selected in the bus stop panel, the terminal 100 may highlight and display the bus moving to the bus stop in a map area, or when a moving bus is selected in the map area, the terminal 100 may display the route of the selected bus on a map, and provide a driving mode for driving (navigating) the route of the selected bus. In this case, since the bus stop has been selected from the detailed result of the pathfinding, the terminal 100 may display only the buses that the user needs to take to reach the destination on the map area or the bus stop panel, or may display all buses that pass through the bus stop on the map area or the bus stop panel. When the terminal 100 displays all the buses that pass through the bus stop in the map area or in the bus stop panel, the terminal 100 may separately display the buses that the user needs to take to get to the destination. On the other hand, when the terminal 100 moves from the detailed result of the pathfinding to the map screen, the terminal 100 may display the entire buses moving on the roadway in the map area. If a position view of a particular bus route is selected in the detailed result of the pathfinding, the terminal 100 may display an icon of the bus for which the bus position view button is selected or a route for which the bus position view button is selected to be distinguished from other buses.

The real-time bus information providing method is stored in a computer-readable storage medium, and is provided by the application 110 executed by the processor of the terminal 100. The application 110 may include instructions to transmit a bus stop identifier selected in the map area to the server 200 to receive ultra-precise bus information that is scheduled to arrive at the bus stop, and, based on the ultra-precise bus information, to display in the map area at least one bus that is moving toward the bus stop and disappearing after passing the bus stop, and to display a bus stop panel that provides information about the buses scheduled to arrive at the bus stop. The application 110 may include instructions that, when the bus position view for a specific bus is selected in the bus stop panel, highlights and displays the corresponding bus that is traveling to the bus stop in the map area. The application 110 may include instructions that, when a moving bus is selected in the map area, display the route of the selected bus on the map, and provide a driving mode for driving (navigating) the route of the selected bus.

Figure 8:
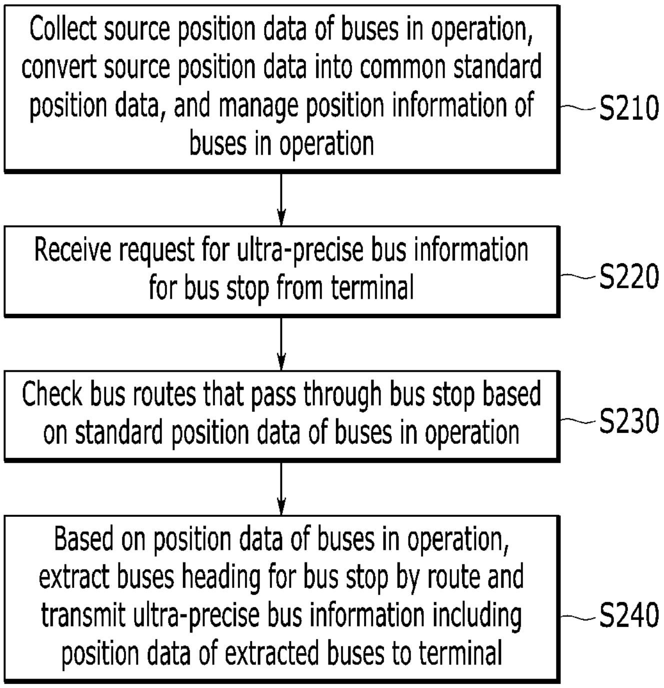
FIG. 8 is a flowchart illustrating a real-time bus information providing method by a server according to an exemplary embodiment.

FIG. 8 is a flowchart illustrating a method for providing bus information in real time by a server according to an exemplary embodiment.

Referring to FIG. 8, the server 200 collects source position data of buses in operation, converts the source position data into common standard position data, and manages the position information of the buses in operation (S210). The source position data may be obtained from the local government system in the operating regions that manages the operation information of the buses. The server 200 may remove position data having low reliability, past data, and position data from buses that are not running. In this case, the server 200 may assign a unique vehicle identifier to the buses in each operating region with route numbers and vehicle numbers to uniquely identify and manage the buses operating throughout the country.

The server 200 receives a request for ultra-precise bus information for a bus stop from the terminal 100 (S220). The bus stop may be selected from the map area, or may be selected from the list screen provided as the detailed result of the bus stop search or the pathfinding. The server 200 may be periodically requested for ultra-precise bus information about the bus stop.

The server 200 checks bus routes that pass through the bus stop based on the standard position data of the buses in operation (S230).

Based on the position data of the buses in operation, the server 200 extracts the buses heading for the bus stop by route and transmits the ultra-precise bus information including the position data of the extracted buses to the terminal 100 (S240). The ultra-precise bus information may include each bus's route number, vehicle number, vehicle speed, position update time, service area, bus type, and estimated time of arrival at the bus stop. The ultra-precise bus information may further include a bus route, a list of bus stops to which the corresponding bus on the route is headed, and the list of bus stops may be sorted in order of proximity to the bus.

The real-time bus information providing method is stored in a non-transitory computer-readable storage medium, and is provided by the server program executed by the processor of the server 200. The server program may include instructions that collect source position data of buses in operation, convert the source position data into common standard position data, and manage the position information of the buses in operation. The server program may include instructions that, when a request for the ultra-precise bus information for the bus stop is received from the terminal 100, checks bus routes that pass through the bus stop based on the standard position data of the buses in operation, extracts the buses heading for the bus stop by route based on the position data of the buses in operation, and transmits the ultra-precise bus information including the position data of the extracted buses to the terminal 100.

According to the exemplary embodiment, while conventional methods provide the estimated arrival time for scheduled bus routes at a bus stop, the present disclosure may provide the real-time position of a bus that is scheduled to arrive at a bus stop through an animated representation on a map, and provide various information including the route for the selected bus.

Figure 9:
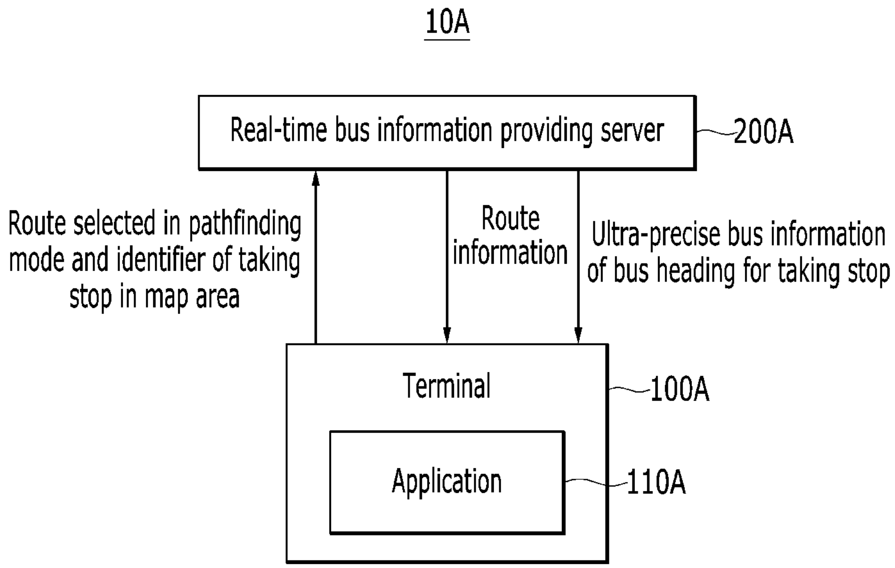
FIG. 9 is a schematic diagram illustrating a real-time bus information providing system according to another exemplary embodiment.

FIG. 9 is a schematic diagram illustrating a system for providing bus information in real time according to another exemplary embodiment.

Referring to FIG. 9, a real-time bus information providing system 10A may provide a real-time bus information service that displays real-time movements of buses on a map, based on up-to-the-second updates of bus position. The real-time bus information providing system 10A may include a terminal 100A and a real-time bus information providing server (simply referred to as the "server") 200A.

The terminal 100A includes an application 110A that communicates with the server 200A. The terminal 100A executes the application 110A and performs the operations of the present disclosure in conjunction with the server 200A.

The application 110A may include instructions for providing real-time bus information in conjunction with the server 200A, and display an interface screen exemplarily described in the present disclosure. The application 110A may be, for example, an application for a map service that provides a pathfinding service based on transportation means, a navigation service, and so on. The application 110 may provide the real-time bus information service, which can be accessed through a dedicated menu, or may additionally integrate the real-time bus information service into existing services, such as a pathfinding service or a navigation service. In describing the present disclosure, the terminal 100A executing the application 110A may be described as the subject of the operation, or the application 110A running on the terminal 100A may be described as the subject of the operation, as needed.

In the following, the real-time bus information service of the present disclosure may be referred to as an ultra-precise bus service, distinguishing it from existing services that solely provide bus arrival times. The real-time bus information may be referred to as ultra-precise bus information. Furthermore, the buses for which the real-time bus information is provided may be referred to as ultra-precise buses, emphasizing their real-time tracking capabilities. The ultra-precise bus is represented by a bus icon on the map. The bus icon may move in real time on the map, reflecting the actual position data of the bus.

The terminal 100A may receive various route information according to the public transportation means from the server 200A when a departure and a destination are input in the pathfinding mode, and display the various path information as pathfinding results. The terminal 100A may provide route information, such as travel time by route, taking/transfer/arrival stops, information on bus routes to be taken, and arrival time, on a list screen, and when a predetermined route is selected on the list screen, the terminal 100A may enter the map screen that may provide detailed route information, and visually show the route on a map.

Based on the route information received from the server 200A, the terminal 100A may display a route connected by sections according to a means of transportation (walking, bus, subway, and the like) in a map area. In this case, the terminal 100A may display at least one bus that is scheduled to arrive at the bus stop at which a user takes the bus (simply referred to as a "taking stop") when the route information includes a taking step that requires taking the bus at the bus stop indicated in the map area. The buses that are displayed in the map area along with the taking stops may be called target buses. The taking stop does not have to be the initial taking stop, and when a predetermined taking stop guided by the route information is be indicated in the map area according to the movement of the screen, target buses headed to the indicated taking stop may be displayed.

Based on the route information, the terminal 100A may extract a taking stop identifier and bus route information of the bus to be taken from the map area, and transmit the extracted taking stop identifier and bus route information of the bus to be taken to the server 200A, so that the user may receive ultra-precise bus information regarding at least one bus that the user can take at the taking stop. Alternatively, the terminal 100A may transmit the taking stop identifier and the destination to the server 200A, so that the user may receive ultra-precise bus information regarding at least one bus that the user can take at the taking stop, but it is assumed in the description that the terminal 100A transmits the taking stop identifier and the bus route information of the bus to be taken to the server 200A. The bus route information may include a list of bus routes.

The terminal 100A may periodically receive ultra-precise bus information from the server 200A to display buses that are approaching the taking stop while the taking stop is displayed in the map area. Here, the terminal 100A may not display buses that have passed the taking stop in the map area based on the ultra-precise bus information. On the other hand, when the terminal 100A enters a map area corresponding to a particular route from a list screen including one or more routes in the pathfinding mode, the terminal 100A may receive ultra-precise bus information related to the first taking stop near the point of departure in advance from the server 200A.

The ultra-precise bus information may include position data for buses heading forward a taking stop, and may further include a route number, a vehicle number, vehicle speed, position update time, and the like. In addition, the ultra-precise bus information may further include service areas, such as Jeju and Seoul, and bus types, such as branch line buses, trunk line buses commonly known as blue color buses in Korea, and village buses. The ultra-precise bus information may include point position data collected at specific time intervals, such as every one second, over a designated period, such as five seconds. The ultra-precise bus information may further include a bus route, a list of bus stops to which the corresponding bus on the route is headed, and the list of bus stops may be sorted in order of proximity to the bus. The ultra-precise bus information may include an estimated time of arrival (for example, two minutes in advance) to the taking stop for each position data. The estimated time of arrival may also be calculated by the terminal 100A based on the position data and vehicle speed.

According to one exemplary embodiment, the buses displayed in the map area may be determined by the server 200A and provided to the terminal 100A. According to another exemplary embodiment, the terminal 100A may receive ultra-precise bus information of a plurality of buses heading for the taking stop from the server 200A, and display the at least one bus determined based on the set conditions in the map area. In this case, the terminal 100A may compare the estimated times of arrival of the buses scheduled to arrive at the taking stop based on the ultra-precise bus information, and determine at least one bus in order of earliest arrival. For example, the terminal 100A may determine the bus scheduled to arrive first at the taking stop as the target bus to be displayed in the map area. Alternatively, the terminal 100A may determine the bus scheduled to arrive at the taking stop within a certain amount of time as the target bus. Here, the terminal 100A may receive an input of a reference of the estimated time of arrival from the user. The terminal 100A may determine one target bus for each bus route scheduled to arrive at the taking stop, or may determine a target bus from a specific bus route input from the user.

The target bus may have a different color assigned depending on the bus type, and in addition to this, the target bus may be displayed visually differently based on conditions.

The terminal 100A may compare the estimated time of arrival of buses scheduled to arrive at the taking stop with the travel time from the current position or the point of departure to the taking stop (for example, a five-minute walk) and visually differently display the buses scheduled to arrive depending on the possibility that the user takes the bus. For example, a bus that arrives before or close to the time the user arrives at the taking stop may be semi-transparently displayed to indicate that it is difficult for the user to take, or flashed to indicate that the user needs to hurry to take.

The terminal 100A may obtain from the server 200A the status of the buses scheduled to arrive at the taking stop (for example, the number of empty seats, low-floor buses, wheelchair-accessible buses, and electric buses) and visually differently display the buses scheduled to arrive depending on the status of the buses. The terminal 100A may receive an input of the user's preferred bus status, determine whether the bus scheduled to arrive is the user's preferred bus, and visually display the bus.

Taking into account the position of the target bus scheduled to arrive at the taking stop, the terminal 100A may modify the map scale or move the map so that the taking stop and the target bus are displayed on the same screen. Of course, when the distance between the taking stop and the target bus is equal to or greater than a reference, or when no buses are running, the target bus may not be displayed.

The terminal 100A may continuously receive ultra-precise bus information from the server 200A while the taking stop is displayed in the map area, and may display the target bus that moves smoothly based on the updated position. Here, the terminal 100A may not display the target bus that has passed the taking stop in the map area, but may display a new target bus in the map area. The server 200A may not transmit the ultra-precise bus information of the target bus that has passed the taking stop to the terminal 100A. Thus, when the target bus that was moving in the map area is not included in the ultra-precise bus information newly received from the server 200A, the terminal 100A may determine that the target bus has passed the taking stop. Alternatively, even though the target bus is included in the ultra-precise bus information newly received from the server 200A, when the stop information to which the target bus is headed does not include a taking stop, the terminal 100A may determine that the target bus has passed the taking stop.

The terminal 100A may display a message notifying the arrival of the bus when the target bus that has been approaching the taking stop arrives. This allows the user to recognize that the bus that had been shown on the map has passed the taking stop.

Once the target bus is selected, the terminal 100A may display a route of the target bus on the map. The terminal 100A may provide a driving mode to drive (navigate) the route of the selected bus. The terminal 100A may call an API to track the selected bus, move the map so that the bus position obtained through the API is the center of the map area, and display the bus traveling the route on the screen. In this case, the terminal 100A may apply a visual effect on the bus icon or around the bus icon to represent the bus in the driving mode.

The terminal 100A may generate a bus animation that moves in real time on the map according to the real-time position data of the target bus, and naturally move the bus icon on the map. To achieve this, the terminal 100A may generate continuous linear data from point position data included in the ultra-precise bus information, and combine the unmoved portion of the continuous linear data created in the previous cycle with the continuous linear data of the current cycle. Further, the terminal 100A may progressively move the bus icon on the screen along the continuous linear data. In this case, the terminal 100A may apply a curve algorithm to the connection part of the continuous linear data to create an animation in which the bus naturally rotates and moves. In this case, the terminal 100A may receive a bus route from the server 200A and generate continuous linear data that travels along the bus route. If a user action, such as moving the screen, interrupts the ongoing bus animation in the current cycle, the bus animation for the current cycle needs to be played again. In this case, the terminal 100A may quickly resume playing the bus animation from the interrupted position data, or skip to the point where the current position data was skipped.

On the other hand, it is possible for network issues or GPS problems to result in inaccurate position data to be collected. This can lead to undesirable animations, such as reverse animations or rotating animations. Thus, the server 200A may remove abnormal data from the source position data, such as sudden and drastic changes in direction of travel or rapid shifts in position That is, when the direction of travel changes drastically beyond the reference or is reversed, or the position data indicates an abnormal position, the server 200A may determine the cases as abnormal position data and remove the abnormal position data. The terminal 100A may generate linear data based on ultra-precise bus information from which the abnormal data has been removed. On the other hand, the terminal 100A generates linear data in which continuous position data of each bus are connected, and when the direction of travel changes rapidly beyond the reference or is reversed, or when the position data indicates an abnormal position, the terminal 100A may generate the bus animation after removing the abnormal position data. When the direction calculated based on the last position of the previous cycle and the first position of the current cycle changes rapidly by a reference value or more, the terminal 100A may determine that the position data is inaccurate position data and discard the inaccurate position data.

The server 200A obtains information from the application 110A running on the terminal 100A and provides information necessary to configure the terminal screen. Specifically, the server 200A receives from the terminal 100A, an identifier of a taking stop displayed in the map area and information of a bus route to be taken. Then, the server 200A may extract at least one bus heading for the taking stop based on the position information of the route buses included in the bus route information, and transmit ultra-precise bus information of the extracted bus to the terminal 100A. In this case, the server 200A may extract at least one bus from among the buses heading for the taking stop in an order close to the taking stop, and transmit the ultra-precise bus information of the extracted bus to the terminal 100A. For example, the server 200A may transmit ultra-precise bus information (route number, vehicle number, position data, vehicle speed, update time, and the like) of bus number 446, which is scheduled to arrive first at A city hall stop, to terminal 100A. Alternatively, the server 200A may transmit ultra-precise bus information of a plurality of buses scheduled to arrive at the A city hall stop to the terminal 100A so that the terminal may determine a target bus to be displayed on the screen.

The source position data of the buses in operation may be obtained from the local government system in the service area that manages the operation information of the buses. Since bus position data is collected in a system that is not the same for each local government system, the server 200A may convert the bus position data collected for each operating region, such as Jeju, Busan, and Seoul, a common standardized position data and generate ultra-precise bus information. The server 200A may assign unique vehicle identifiers to buses in each operating region with route numbers and vehicle numbers to uniquely identify and manage buses operating across the country. In this case, the server 200A may remove position data that is less reliable, and may remove past data. Further, since the position data of the buses waiting in the garage does not need to be provided to the user, the server 200A may remove the position data of the unoperated buses.

In the following, various interface screens provided by the application 110A executed on the terminal 100A will be described.

Figure 10:
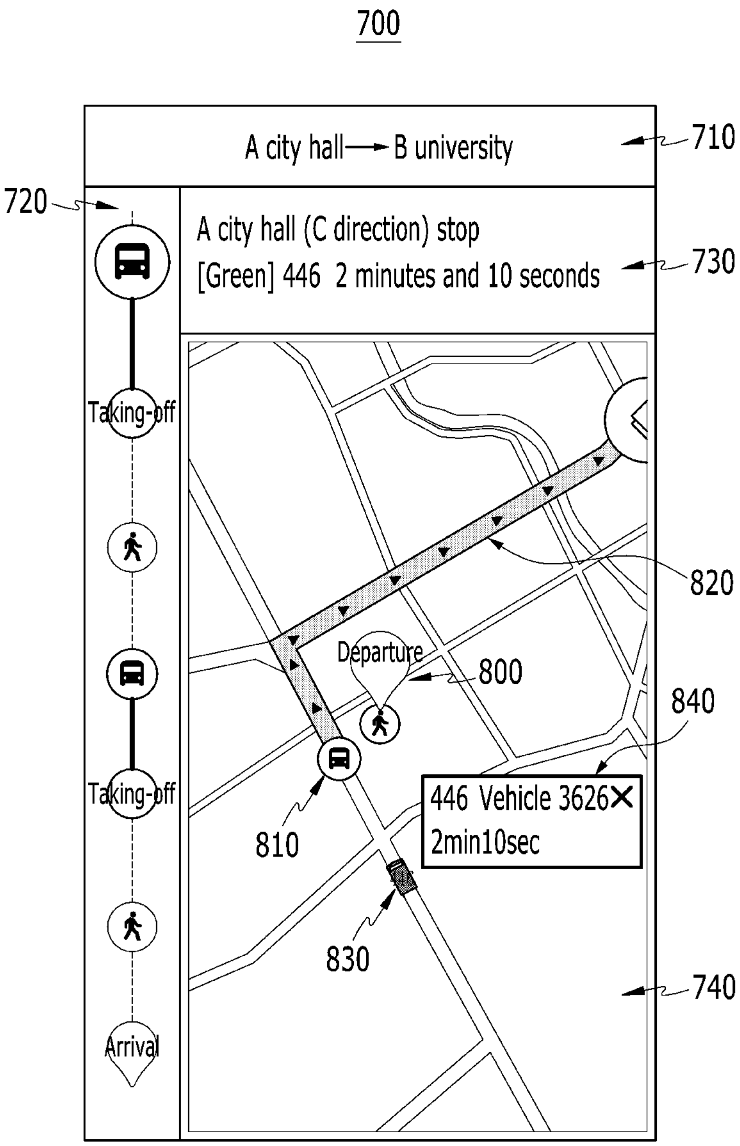
FIGS. 10 and 11 are diagrams illustrating examples of a real-time bus information providing screen according to another exemplary embodiment.
Figure 11:
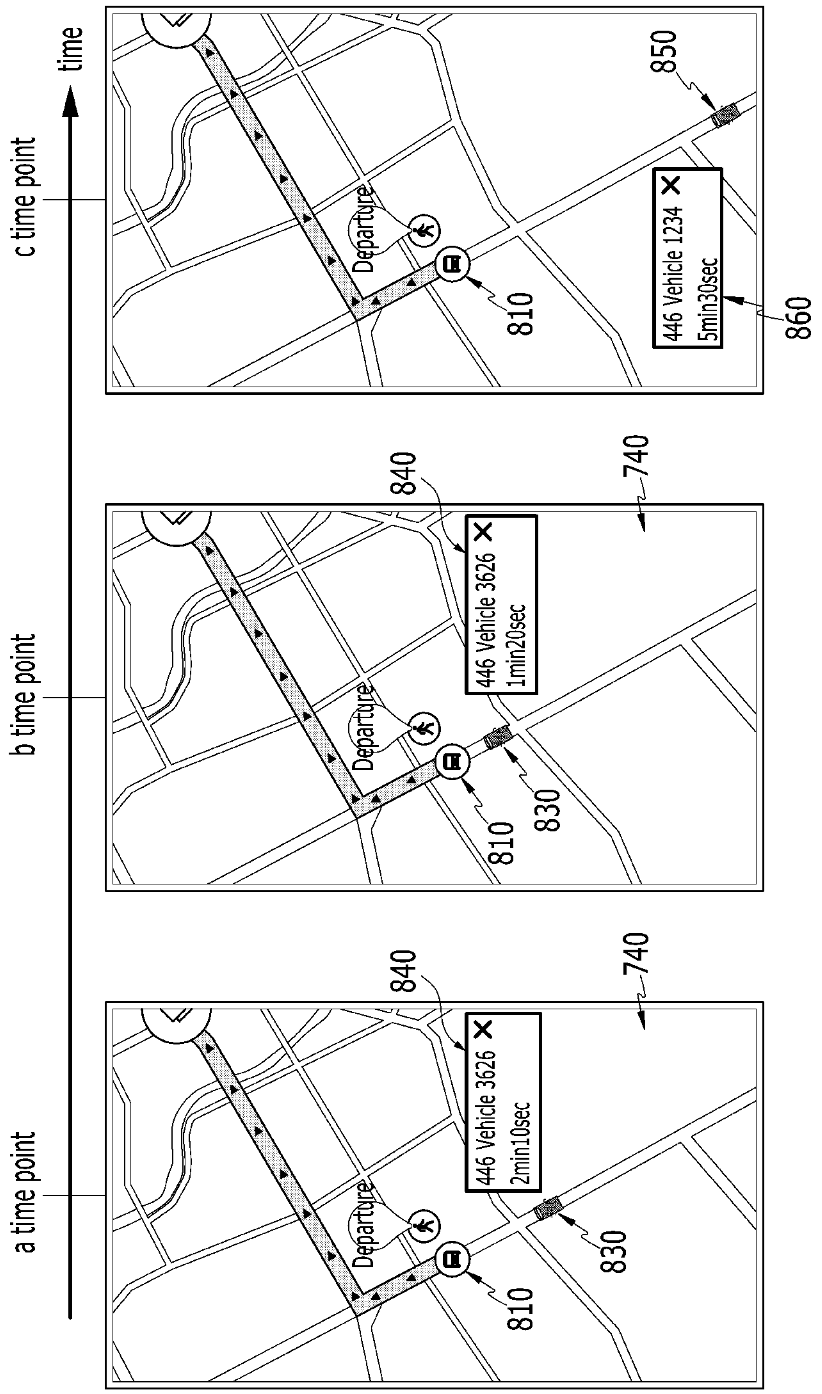

FIGS. 10 and 11 are diagrams illustrating examples of a real-time bus information providing screen according to another exemplary embodiment.

Referring to FIG. 10, when a route from a departure, A city hall, to a destination, B university, is selected in the pathfinding mode, the terminal 100A may obtain route information from the server 200A and display a pathfinding screen 700 that visually shows the route on a map. Route information may include the point of departure, the destination, sections based on means of travel (walking, bus, subway, and the like), and taking and taking-off information for each section. The taking and taking-off information may include a taking stop, a list of bus routes that can be taken at the taking stop and arrival times of the buses, stopover stops, taking-off stops, and the like.

The layout of the pathfinding screen 700 may be variously configured based on the route information, and for example, may include an area 710 displaying the point of departure and the destination, an area 720 summarizing the route, a stop information area 730, and a map area 740. In the map area 740, a departure marker 800 may be displayed at the point of departure, and route information, such as a bus stop 810 and a route 820, included in the route may be displayed. The bus stop 810 represented by the icon may be a taking stop, and scheduled arrival information for the buses to be taken may be displayed in the stop information area 730.

In this case, at least one bus scheduled to arrive at the bus stop 810 may be displayed in the map area 740 in the form of a bus icon 830. The bus icon 830 is an ultra-precise bus that moves in real time in the map area. Additionally, the information about the bus schedule to arrive may be displayed near the bus icon 830 as a pop-up message 840. The pop-up message 840 may include a route number, a vehicle number, an estimated time of arrival, and the like. Additionally, the pop-up message 840 may include vehicle speed, update time, and vehicle attributes (for example, low-floor bus, and ultra-precision bus).

The bus icon 830 is an animated representation moving on a roadway by position data included in the ultra-precise bus information, and may be played on a higher layer of the map area. The bus icon 830 may be displayed with a route number on the bus icon 830, and the route number may be adjusted to fit the size of the bus icon. In this case, the route number may not be visible at smaller map scales, but may be visible on maps zoomed to a certain scale level or higher. The bus icon 830 may have a color assigned based on the type of bus included in the ultra-precise bus information. The bus icon 830 may be a bus icon of a size and a shape specified by the scale level. The bus icon for each scale level may be created by considering the proportion of road width at the corresponding scale level.

By using the ultra-precise bus information of the target bus to be displayed on the map, the terminal 100A may create and play a bus animation showing the bus icon 830 moving smoothly in real-time along the roadway. For example, the terminal 100A may create a 5-second animation of the target bus by using the ultra-precise bus information at 5-second intervals. To display the bus schedule to arrive on the map in real time, the terminal 100A may check a bus taking step at the bus stop 810 visible on the pathfinding screen 700 (for example, taking at the A City Hall (direction C) stop), transmit the identifier of the bus stop 810 and the information on the bus route to be taken to the server 200A, and request ultra-precise bus information.

Referring to FIG. 11, the bus stop 810 is still displayed in the map area 740 at time point a, and then the bus icon 830 that gradually moves closer to the bus stop 810 is displayed. In this way, the terminal 100A may periodically acquire the ultra-precise bus information to generate continuous movement, as the bus position needs to be updated until the bus icon 830 arrives at the bus stop 810.

At time point b, during the continuous display of the bus stop 810 on the screen, the bus icon 830 gradually moves closer to the bus stop 810 and disappears when passes the bus stop 810. Then, at time point C, a new bus icon 850 may appear on the screen, and information about the new target bus may be displayed through a pop-up message 860.

As such, during the display of the taking stop in the map area, at least one bus icon approaching the taking stop is displayed, but when the user moves the map to another area that does not have a taking stop, the terminal 100A may no longer need to display the bus icon, and thus may not request ultra-precise bus information from the server 200A.

On the other hand, the bus icon 830 that is gradually moving toward the taking stop may be selected. Then, the terminal 100A may display a route of selected bus number 446 on the map. The route of the selected bus may be displayed alongside, and distinct from, the route to the destination displayed in the map area 740. In addition, a driving mode may be provided to drive (navigate) the route of the selected bus. The terminal 100A may call an API to track the selected bus, move the map so that the bus position obtained through the API is the center of the map area, and display the bus traveling the route on the screen. In this case, the terminal 100A may provide a visual effect on the bus icon or around the bus icon to represent the bus in the driving mode.

Figure 12:
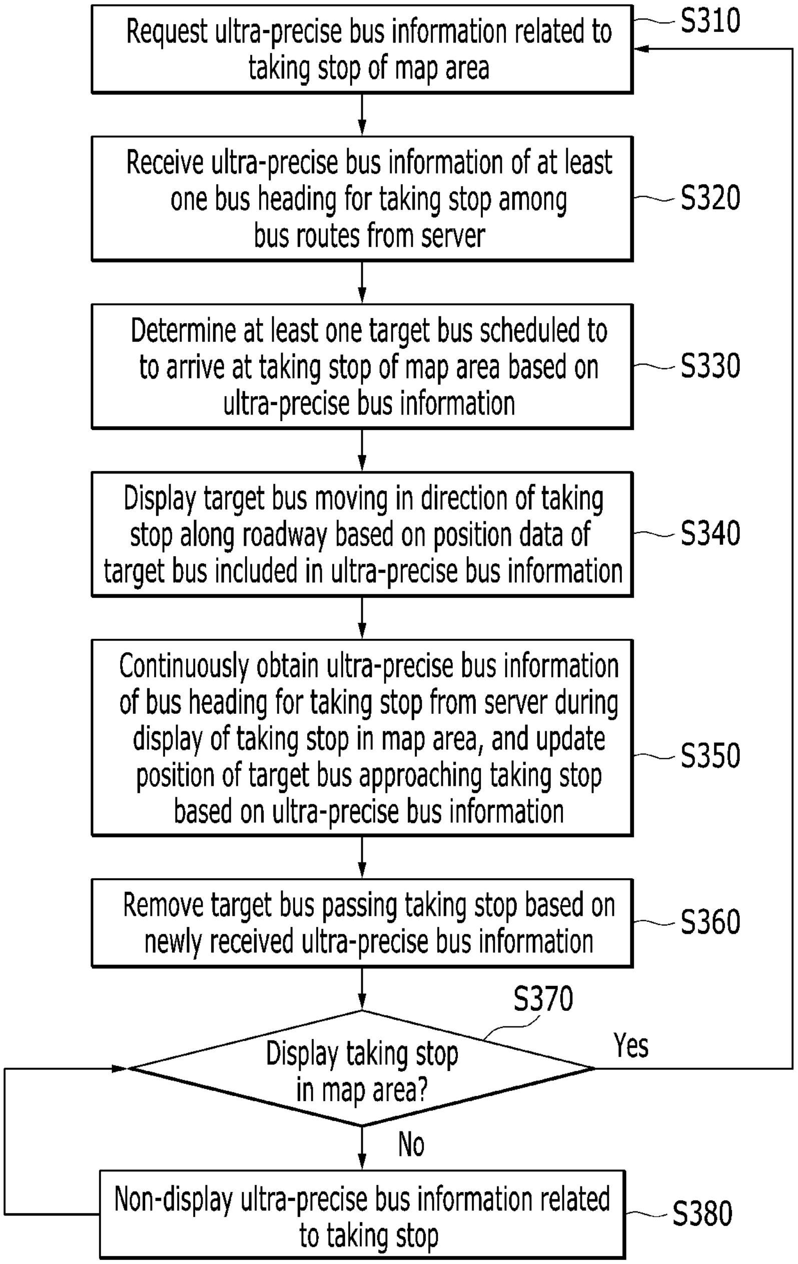
FIG. 12 is a flowchart illustrating a real-time bus information providing method by a terminal according to another exemplary embodiment.

FIG. 12 is a flowchart illustrating a method for providing bus information in real time by a terminal according to another exemplary embodiment.

Referring to FIG. 12, the terminal 100A executing the application 110A displays a map area and requests ultra-precise bus information related to the taking stops in the map area from the server 200A (S310). The terminal 100A may extract a taking stop identifier and information on a bus route to be taken at the taking stop from the route information obtained in the pathfinding mode, and transmit the extracted taking stop identifier and information on the bus route to be taken at the taking stop to the server 200A. The map area may visually show at least a portion of the route connecting the point of departure to the destination in the pathfinding mode. The terminal 100A may extract the taking stop identifier and the information on the bus route to be taken at the taking stop from the route information when the route information connecting the point of departure to the destination has a taking step that requires taking a bus at a bus stop indicated in the map area. When the route connecting the point of departure to the destination is selected, the terminal 100A may display detailed route information and may enter a screen that visually shows the selected route on the map. When the terminal 100A displays the selected route on the map in the pathfinding mode, the terminal 100A may request ultra-precise bus information related to the taking stop from the server 200A when there is a taking stop visible on the map along with the point of departure.

The terminal 100A receives, from the server 200A, ultra-precise bus information of at least one bus heading for the taking stop among the bus routes to be taken (S320). The ultra-precise bus information may include position data for buses heading forward the taking stop, and may further include a route number, a vehicle number, vehicle speed, position update time, service area, bus type, and the like. The ultra-precise bus information may include point position data collected at specific time interval, such as every one second, over a designated period, such as five seconds. The ultra-precise bus information may further include a bus route, a list of bus stops to which the corresponding bus on the route is headed, and the list of bus stops may be sorted in order of proximity to the bus.

Based on the ultra-precise bus information, the terminal 100A determines at least one target bus scheduled to arrive at the taking stop in the map area (S330). When the server 200A transmits the ultra-precise bus information of the buses heading for the taking stop among the bus routes to the terminal 100A, the terminal 100A may determine a target bus to be displayed on the map based on the set conditions. For example, based on the ultra-precise bus information, the terminal 100A may compare the estimated times of arrival of the buses scheduled to arrive at the taking stop and determine at least one target bus in order of earliest arrival. The terminal 100A may determine buses that are scheduled to arrive at the taking stop within a certain time as target buses. The terminal 100A may determine a target bus for each bus route scheduled to arrive at the taking stop, or may determine a target bus from a specific bus route input from the user. Alternatively, the server 200A may determine the target bus and transmit ultra-precise bus information about the determined target bus to the terminal 100A.

Based on position data of the target bus included in the ultra-precise bus information, the terminal 100A displays the target bus moving along the roadway in the direction of the taking stop (S340). The terminal 100A may display the target bus moving along the roadway by gradually moving a bus icon corresponding to the target bus along linear data in which continuous position data are connected to generate a bus animation, and playing the bus animation on a higher layer of the map area. The terminal 100A may remove abnormal position data, such as abnormally rapid changes in direction of travel or abnormally rapid changes in position, from the position data included in the ultra-precise bus information and then generate linear data. In this case, taking into account the position of the target bus scheduled to arrive at the taking stop, the terminal 100A may change the map scale or move the map so that the taking stop and the target bus are displayed on the same screen.

During the display of the taking stop in the map area, the terminal 100A continuously obtains the ultra-precise bus information of the bus heading for the taking stop from the server 200A, and updates the position of the target bus approaching the taking stop based on the ultra-precise bus information (S350). If the newly received ultra-precise bus information includes position data of the target bus moving on the screen, the terminal 100A may gradually move the position of the target bus on the map based on the position data of the target bus, and display the new target bus in the map area.

Based on the newly received ultra-precise bus information, the terminal 100A removes the target bus that has passed the taking stop from the map area (S360). When the newly received ultra-precise bus information does not include the target bus moving on the screen, or even though the target bus moving on the screen is included in the newly received ultra-precise bus information, but the information about the stop to which the target bus is heading does not have a taking stop, the terminal 100A may determine that the target bus moving on the screen has passed the taking stop and remove the target bus from the screen.

Next, the terminal 100A may monitor whether the taking stop is displayed in the map area (S370) and, when the taking stop is displayed continuously, the terminal 100A may continue to acquire ultra-precise bus information and display a real-time target bus approaching the taking stop, and to this end, the terminal 100A may move to a designated operation (for example, S110, and S120).

When the taking stop is not visible in the map area, the terminal 100A may not display the ultra-precise bus information related to the taking stop on the screen (S380) and may proceed to operation S370 of monitoring whether the taking stop is visible in the map area by moving the screen and the like. The terminal 100A can continue to receive the ultra-precise bus information related to the taking stop for a certain period of time even when the screen is moved and the stop or the bus that was displayed is not visible on the map, and display the ultra-precise bus information related to the taking stop uninterruptedly when the screen returns to the area where the original taking stop was displayed again. When it is unnecessary to display the target bus heading for a previous taking stop, such as when the screen is moved and a new stop is changed to the taking stop, the terminal 100A may stop receiving the ultra-precise bus information related to the previous taking stop and receive the ultra-precise bus information related to the new taking stop.

Although the operations of updating the position of the target bus and displaying the new target bus are separated in FIG. 12 for the sake of explanation, the terminal 100A may periodically obtain ultra-precise bus information of the bus heading for the taking stop from the server 200A while the taking stop is displayed in the map area, and display the movement of the bus scheduled to arrive at the taking stop in the map area based on the ultra-precise bus information.

The real-time bus information providing method is stored in a non-transitory computer-readable storage medium and provided by the application 110A executed by the processor of the terminal 100A. The application 110A may include instructions for transmitting an identifier of a taking stop visible in the map area and information of a bus route to be taken at the taking stop to the server 200A, and upon receiving ultra-precise bus information of at least one bus heating for the taking stop among the bus routes, determining, based on the ultra-precise bus information, at least one target bus scheduled to arrive at the taking stop in the map area, and displaying the target bus moving along a roadway in the direction of the taking stop based on position data of the target bus included in the ultra-precise bus information. In addition, the application 110A may include instructions for continuously obtaining from the server 200A, ultra-precise bus information of a bus heading for the taking stop while the taking stop is displayed in the map area, updating the position of the target bus approaching the taking stop based on the ultra-precise bus information, determining that the target bus has passed the taking stop based on the newly received ultra-precise bus information, and removing the target bus that has passed. The application 110A may include instructions for determining whether a taking stop is displayed in the map area, and when the taking stop is still displayed, obtaining ultra-precise bus information and displaying a target bus approaching the taking stop on the map in real time, and when the taking stop is not visible in the map area, not-displaying the ultra-precise bus information related to the taking stop on the screen, and monitoring whether the taking stop is displayed in the map area by the screen movement and the like. On the other hand, the application 110A may include instructions for continuing to receive ultra-precise bus information related to the taking stop for a period of time even though the screen is moved so that the stop or the previously displayed bus is not visible on the map, and displaying the ultra-precise bus information related to the taking stop uninterruptedly on the screen when the screen returns to the area where the taking stop was originally displayed again. The application 110A may include instructions for, when it is unnecessary to display the target bus heading for a previous taking stop, such as when the screen is moved and a new stop is changed to the taking stop, stopping to receive the ultra-precise bus information related to the previous taking stop and receiving the ultra-precise bus information related to the new taking stop.

Figure 13:
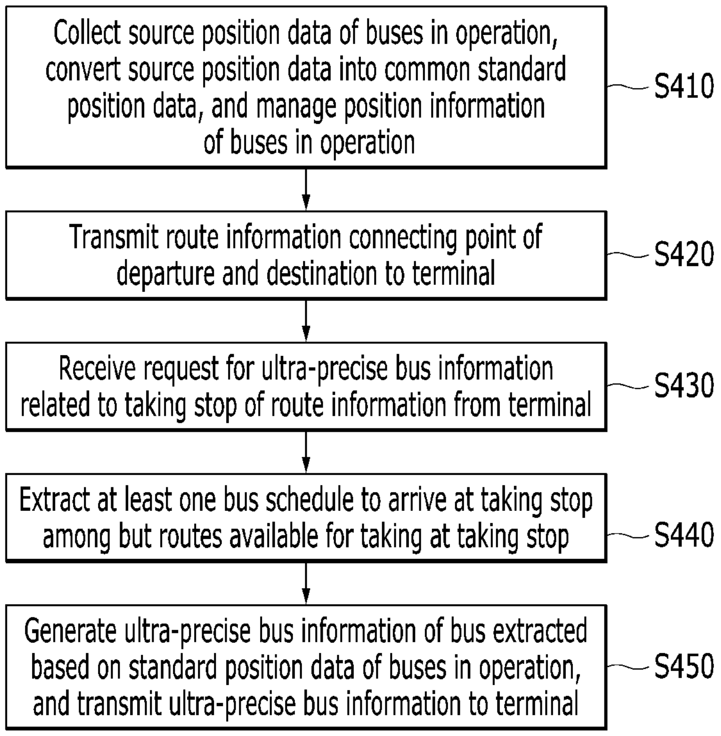
FIG. 13 is a flowchart illustrating a real-time bus information providing method by a server according to another exemplary embodiment.

FIG. 13 is a flowchart illustrating a method for providing bus information in real time by a server according to another exemplary embodiment.

Referring to FIG. 13, the server 200A collects source position data of buses in operation, converts the source position data into common standard position data, and manages the position information of the buses in operation (S410). The source position data may be obtained from the local government system in the operating regions that manages the operation information of the buses. The server 200A may remove position data having low reliability, past data, and position data from buses that are not running. The server 200A assigns unique vehicle identifiers to buses in each operating region with route numbers and vehicle numbers to uniquely identify and manage buses operating across the country.

The server 200A transmits route information connecting a point of departure and a destination to the terminal 100A (S420). The terminal 100A may visually display the route information retrieved in the pathfinding mode on a map. In this case, the route information may include a taking step that requires taking a bus at a bus stop, and may include information about the bus route to be taken at the taking stop.

The server 200A receives a request for ultra-precise bus information related to the taking stop of the route information from the terminal 100A (S430). The request for ultra-precise bus information may include a taking stop identifier and information about the bus route to be taken at the taking stop.

Based on standard position data of buses in operation, the server 200A extracts at least one bus that is scheduled to arrive at the taking stop from among the bus routes at the user can take at the taking stop (S440).

The server 200A generates ultra-precise bus information of the extracted bus based on the standard position data of the buses in operation, and transmits the ultra-precise bus information to the terminal 100A (S450). The ultra-precise bus information may include position data for buses heading forward the taking stop, and may further include a route number, a vehicle number, vehicle speed, position update time, service area, bus type, and the like. The ultra-precise bus information may include point position data collected at specific time interval, such as every one second, over a designated period, such as five seconds. The ultra-precise bus information may further include a bus route, a list of bus stops to which the corresponding bus on the route is headed, and the list of bus stops may be sorted in order of proximity to the bus. Based on the ultra-precise bus information, the buses moving in real time may be displayed in the map area of the terminal 100A.

The real-time bus information providing method is stored in a non-transitory computer-readable storage medium, and is provided by the server program executed by the processor of the server 200A. The server program may include instructions that collect source position data of buses in operation, convert the source position data into common standard position data, and manage the position information of the buses in operation. The server program may include instructions for transmitting route information connecting the point of departure and the destination to the terminal 100A. The server program may include instructions for, upon receiving a request for ultra-precise bus information related to a taking stop in the route information from the terminal 100A, extracting at least one bus scheduled to arrive at the taking stop from a list of bus routes that the user can take at the taking stop, based on standard position data of buses in operation, and transmitting the ultra-precise bus information of the extracted bus to the terminal 100A.

According to the exemplary embodiment, it is possible to display the buses moving naturally along the roadway on the map.

According to the exemplary embodiment, the user may continuously track the position of the bus scheduled to arrive at a particular bus stop on the map, and check the route of the selected bus on the map.

According to the exemplary embodiment, with the implementation of real-time bus position tracking, users may identify the positions of the buses scheduled to arrive at the taking stop along the chosen route in the pathfinding mode. This allows for intuitive visualization, enabling users to quickly determine the positions of the buses scheduled to arrive. By selecting a bus that is available for boarding, users may conveniently review the bus route information, and make informed decisions about their travel options.

According to the exemplary embodiment, users may obtain various real-time bus information, such as continuously monitoring the position of the earliest bus scheduled to arrive at the taking stop on the map, and monitoring the positions of buses scheduled to arrive at the taking stop within a certain period of time on the map all at once according to the set conditions, or monitoring the positions of buses of a certain route scheduled to arrive at the taking stop. This comprehensive information empowers users to make informed decisions while using the pathfinding mode, allowing them to select suitable buses to get to the destination.

The various exemplary embodiments of the present disclosure described above may be combined to create new exemplary embodiments.

The exemplary embodiments of the present disclosure described above are not only implemented through the apparatus and method, but may also be implemented through programs that realize functions corresponding to the configurations of the exemplary embodiment of the present disclosure, or through recording media on which the programs are recorded.

Although an exemplary embodiment of the present invention has been described in detail, the scope of the present invention is not limited by the exemplary embodiment. Various changes and modifications using the basic concept of the present invention defined in the accompanying claims by those skilled in the art shall be construed to belong to the scope of the present invention.

What is claimed is:

1. A method for providing real-time bus information by a terminal, the method comprising:

receiving ultra-precise bus information about buses scheduled to arrive at a bus stop from a server, wherein the ultra-precise bus information includes, for each route passing the bus stop, position data of a bus scheduled to arrive, and the position data includes point position data collected at specific time interval over a designated period; and playing at least one bus icon animation, which is generated using the ultra-precise bus information, on a map area to display a bus icon that progressively moves toward the bus stop and disappears after passing the bus stop on the map area, wherein the playing of the at least one bus icon animation includes;

removing abnormal position data from the ultra-precise bus information, connecting a plurality of point position data included in the ultra-precise bus information from which the abnormal position data is removed to generate continuous linear data, and generating the at least one bus icon animation that progressively moves the bus icon along the linear data to display the moving bus icon on the map area.

2. The method of claim 1, wherein the bus stop is selected from the map area, or is selected from a list screen provided as a detailed result of a bus stop search or pathfinding.

3. The method of claim 1, wherein the ultra-precise bus information further includes, for each route passing the bus stop, at least one of a route number, a vehicle number, a vehicle speed, and a position update time of the bus scheduled to arrive.

4. The method of claim 1, further comprising:
displaying a bus stop panel that provides information about buses scheduled to arrive at the bus stop.

5. The method of claim 4, further comprising:
when a bus position view for a specific bus among the buses scheduled to arrive displayed on the bus stop panel is selected, highlighting and displaying the specific bus that is moving to the bus stop on the map area.

6. The method of claim 5, further comprising:
displaying a route of the specific bus on the map area.

7. The method of claim 1, further comprising:
determining, based on the ultra-precise bus information, at least one target bus that is scheduled to arrive at a taking stop; and
playing, based on position data of the target bus included in the ultra-precise bus information, a bus icon animation of the target bus moving along a roadway of the map area in a direction of the taking stop,
wherein the taking stop is a bus stop where buses of bus routes pass in a path connecting a point of departure to a destination.

8. The method of claim 7, further comprising:
receiving the ultra-precise bus information by transmitting an identifier of the taking stop and bus route information of a bus to be taken at the taking stop to the server.

9. A method for providing real-time bus information by a server, the method comprising:
receiving a request for ultra-precise bus information related to a bus stop from a terminal;
checking bus routes that pass through the bus stop;
extracting, based on position data of buses in operation, at least one bus heading for the bus stop from the bus routes; and
transmitting ultra-precise bus information of the extracted buses to the terminal, wherein the ultra-precise bus information includes position data of each extracted bus, and the position data includes point position data collected at specific time interval over a designated period,
wherein a bus icon of a corresponding bus progressively moving toward the bus stop along is displayed on a map area by playing a bus icon animation generated using the ultra-precise bus information, and
wherein the bus icon animation is generated by progressively moving the bus icon along linear data, the linear data being generated by removing abnormal position data from the ultra-precise bus information and connecting a plurality of point position data included in the ultra-precise bus information from which the abnormal position data is removed.

10. The method of claim 9, wherein the ultra-precise bus information further includes at least one of a route number, a vehicle number, a vehicle speed, and a position update time of each extracted bus.

11. The method of claim 9, further comprising:
receiving a request for ultra-precise bus information related to a taking stop from the terminal;
extracting, based on position data of buses in operation, at least one bus scheduled to arrive at the taking stop from among bus routes available for taking at the taking stop; and
transmitting ultra-precise bus information of the extracted buses to the terminal,
wherein the taking stop is a bus stop where buses of the bus routes pass in a path connecting a point of departure to a destination.

12. An application stored in a non-transitory computer-readable storage medium, and comprising instructions for causing a processor to execute:
receiving, from a server, ultra-precise bus information about buses scheduled to arrive at a bus stop displayed on a map area, wherein the ultra-precise bus information includes, for each route passing the bus stop, position data of a bus scheduled to arrive, and the position data includes point position data collected at specific time interval over a designated period;
based on the ultra-precise bus information, displaying a bus stop panel indicating information about buses scheduled to arrive at the bus stop; and
playing at least one bus icon animation, which is generated using the ultra-precise bus information, on a map area to display a bus icon that progressively moves toward the bus stop and disappears after passing the bus stop on the map area,
wherein the playing of the at least one bus icon animation includes;
removing abnormal position data from the ultra-precise bus information,
connecting a plurality of point position data included in the ultra-precise bus information from which the abnormal position data is removed to generate continuous linear data, and
generating the at least one bus icon animation that progressively moves the bus icon along the linear data to display the moving bus icon on the map area.

13. The application of claim 12, wherein the bus stop is selected from the map area, or is selected from a list screen provided as a detailed result of a bus stop search or pathfinding.

14. The application of claim 12, wherein the ultra-precise bus information further includes, for each route passing the bus stop, at least one of a route number, a vehicle number, a vehicle speed, and a position update time of the bus scheduled to arrive.

15. The application of claim 12, further comprising instructions for causing the processor to execute:
when a bus position view for a specific bus among the buses scheduled to arrive displayed on the bus stop panel is selected, highlighting and displaying the specific bus that is moving to the bus stop on the map area.

16. The application of claim 12, further comprising instructions for causing the processor to execute:
playing a bus icon animation of a target bus moving in a direction of the taking stop in the map area by using position data of a bus included in the ultra-precise bus information; and
receiving, from the server, new ultra-precise bus information related to the taking stop, updating the position of the target bus based on the new ultra-precise bus information, and playing a bus icon animation of a new target bus moving in a direction of the taking stop,
wherein the taking stop is a bus stop through which buses of the bus routes to be taken in a path connecting a point of departure to a destination pass.

17. The application of claim 16, further comprising instructions for causing the processor to execute:
receiving the ultra-precise bus information by transmitting an identifier of the taking stop and bus route information of a bus to be taken at the taking stop to the server.

* * * * *